(12) United States Patent
Kato et al.

(10) Patent No.: US 7,800,993 B2
(45) Date of Patent: Sep. 21, 2010

(54) OPTICAL RECORDING MEDIUM, RECORDING METHOD THEREOF AND EVALUATION METHOD OF OPTICAL RECORDING MEDIUM

(75) Inventors: Masaki Kato, Sagamihara (JP); Kazunori Ito, Yokohama (JP); Hiroshi Deguchi, Yokohama (JP); Hiroko Ohkura, Yokohama (JP); Mikiko Takada, Yokohama (JP); Hiroyoshi Sekiguchi, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 651 days.

(21) Appl. No.: 11/662,682

(22) PCT Filed: Sep. 13, 2005

(86) PCT No.: PCT/JP2005/017224

§ 371 (c)(1),
(2), (4) Date: Oct. 9, 2007

(87) PCT Pub. No.: WO2006/030938

PCT Pub. Date: Mar. 23, 2006

(65) Prior Publication Data

US 2009/0046550 A1  Feb. 19, 2009

(30) Foreign Application Priority Data

Sep. 13, 2004 (JP) ............................. 2004-265953
May 6, 2005 (JP) ............................. 2005-134906

(51) Int. Cl.
*G11B 7/00* (2006.01)
(52) U.S. Cl. .............. 369/44.33; 369/47.44; 369/47.53; 369/53.17; 369/275.1; 369/275.5

(58) Field of Classification Search .............. 369/44.33, 369/47.44, 47.53, 275.1, 275.5
See application file for complete search history.

(56) References Cited

U.S. PATENT DOCUMENTS 6,459,666 B1   10/2002  Yokoi
6,678,220 B1 *  1/2004  Saga ........................ 369/44.27

(Continued)

FOREIGN PATENT DOCUMENTS

EP         0802531 A2    10/1997

(Continued)

OTHER PUBLICATIONS

European search report in connection with a counterpart European patent application No. 05 78 5298.

(Continued)

*Primary Examiner*—Thuy N Pardo
(74) *Attorney, Agent, or Firm*—Cooper & Dunham LLP

(57) ABSTRACT

A recording method of an optical recording medium comprises irradiating the medium with a laser having m pulse sets each comprising a heating pulse and a cooling pulse, in which m is a natural number; and scanning the medium with the laser at a scanning speed v to record marks each of a length nT, in which n is a natural number of 3 or more and T is a clock cycle, wherein a length $T_{CPn}$ of a final cooling pulse is determined in accordance with the scanning speed v using the following functions, in $v < v_0$, $T_{CPn}/T = f_{1,n}(v)$ in $v \ v_0$, $T_{CPn}/T = f_{2,n}(v)$, where the $f_{1,n}(v)$ and $f_{2,n}(v)$ each represents a continuous function of the scanning speed v and satisfies the condition where an existence ratio of abnormal marks is $1.0 \times 10^{-4}$ or less, and $v_0$ is a selectable scanning speed.

25 Claims, 12 Drawing Sheets

U.S. PATENT DOCUMENTS

| | | |
|---|---|---|
| 6,751,513 B1 | 6/2004 | Spruit |
| 6,996,052 B1 | 2/2006 | Mizuno et al. |
| 7,453,790 B2 * | 11/2008 | Hwang et al. ............ 369/275.4 |
| 2003/0090981 A1 | 5/2003 | Yokoi |
| 2004/0017755 A1 | 1/2004 | Kato |
| 2004/0052178 A1 * | 3/2004 | Saga ....................... 369/47.53 |
| 2005/0175808 A1 | 8/2005 | Mizuno et al. |

FOREIGN PATENT DOCUMENTS

| | | |
|---|---|---|
| EP | 1047056 A1 | 10/2000 |
| EP | 1182649 A1 | 2/2002 |
| EP | 1361571 A1 | 11/2003 |
| JP | 10-3664 | 1/1998 |
| JP | 2000-322740 | 11/2000 |
| JP | 2001-118245 | 4/2001 |
| JP | 2001-243626 | 9/2001 |
| TW | 455867 | 9/2001 |

OTHER PUBLICATIONS

Taiwanese official action (and English translation thereof) in connection with a counterpart Taiwanese patent application No. 94131542, Aug. 12, 2009.

* cited by examiner

OPTICAL RECORDING MEDIUM, RECORDING METHOD THEREOF AND EVALUATION METHOD OF OPTICAL RECORDING MEDIUM

TECHNICAL FIELD

The present invention relates to a rewritable optical recording medium such as CD-RW, DVD-RW, DVD+RW, DVD-RAM, etc. using a phase-changing material in a recording layer, a recording method of the optical recording medium and an evaluation method of the optical recording medium.

BACKGROUND ART

It has been known to set up parameters for recording speed by linear functions (see Patent Literatures 1 to 3). Particularly, a technique of changing parameters stepwise has been disclosed in the Patent Literatures 2 and 3.

However, it has not been mentioned that the length of at least either of final heating pulses and final cooling pulses (irradiation time) is discontinuously changed.

Rewritable optical disks applied with a phase-changing technique, which are represented by CD-RW, DVD-RW, DVD+RW, etc., have been widely popularized for audio/visual purposes and the information recording purpose of computers. Moreover, improvement of the recording speed onto these optical disks has been anticipated with an increasing capacity of digital information in recent years. Both rewriting performance at a higher scanning speed and rewriting performance in a broader scanning speed range are required for high-speed recording onto optical disks using such a phase-changing technique. The former is the highest recording speed and the latter is equivalent to a recordable speed range. Particularly, the latter corresponds to a CAV (Constant Angular Velocity) recording which is a technique necessary for accelerating random access recording; hence a scale of speed (highest speed/lowest speed) of about 2.4 folds is necessary. Moreover, in the CAV recording, the recording scanning speed v changes corresponding to the recording radius position r, namely, v/r=constant, therefore it must be recordable at any recording speed below the highest recording speed. Furthermore, if the highest speed increases, the scanning speed range also inevitably broadens. For example, in a 4× speed disk of DVD+RW, the scanning speed range of 5.8 to 14.0 m/s is required for the CAV, but in a 8× speed disk, the scanning speed range of 11.6 to 27.9 m/s is required, therefore, the development of such an optical recording medium capable of recording in a very wide range, which can correspond to the 8-hold speed disk, and a recording method of the optical recording medium have been desired.

On the other hand, recording layer material must be changed to material suitable for even higher speed recordings in order to increase the highest recording speed. Usually, a phase-change material is used for the recording layer material of optical disks represented by DVD+RW. For example, in general, the phase change material is made of alloys capable of reversibly changing the phase between an amorphous phase and a crystalline phase. In increasing the recording speed, a phase-change material having a high crystallization rate must be used to accelerate the phase change between the amorphous phase and the crystalline phase.

However, to increase the crystallization rate results in the great difficulty in controlling the crystalline phase at the time of low-speed recording. Therefore, recording methods (strategies) in a speed region close to the highest recording speed and a speed region close to the lowest recording speed must be greatly changed. Hence, there is the problem that it becomes very difficult to record at any recording speed below the highest recording speed if using a recording layer material able to correspond to the high-speed recording.

Patent Literature 1 Japanese Patent Application Laid-Open No. 2000-322740
Patent Literature 2 Japanese Patent Application Laid-Open No. 2001-118245
Patent Literature 3 Japanese Patent Application Laid-Open No. 2001-243626

DISCLOSURE OF INVENTION

An object of the present invention is to provide a recording method capable of a CAV recording for a rewritable optical recording medium applied with a phase-changing technique with the highest recording speed of more than 8× speed of DVD+RW, i.e., a recording method (recording strategy) of the optical medium capable of recording at any recording speed below the highest recording speed of the optical recording medium, an optical recording medium recordable by the recording method and an evaluation method of the optical recording medium.

The present invention provides a recording method of an optical recording medium. In the first aspect of a recording method, there is provided a recording method of an optical recording medium corresponding to different recording speed, which comprises: irradiating the medium with a laser having m pulse sets each comprising a heating pulse of a power Pw and a cooling pulse of a power Pc, in which m is a natural number; and scanning the medium with the laser at a scanning speed v to record marks each of a length nT on the medium, in which n is a natural number of 3 or more, T is a clock cycle, and the relation of m<n is satisfied, wherein: a length $T_{CPn}$ of a final cooling pulse, which is the m-th cooling pulse, is determined in accordance with the scanning speed v using the following functions (1) and (2), in a range of $v<v_0$, $T_{CPn}/T=f_{1,n}(v)$      Function (1)

in a range of $v \geq v_0$, $T_{CPn}/T=f_{2,n}(v)$      Function (2)

where the $f_{1,n}(v)$ and $f_{2,n}(v)$ each represents a continuous function of the scanning speed v to satisfy the relation of $f_{1,n}(v_0) > f_{2,n}(v_0)$; the $f_{1,n}(v)$ and $f_{2,n}(v)$ each satisfies the condition where an existence ratio of abnormal marks, which is a ratio of the number of abnormal marks to the number of normal marks, is $1.0 \times 10^{-4}$ or less, the normal mark satisfying the requirement of $L/nT \geq n-0.5$ and the abnormal mark satisfying the requirement of $L/nT < n-0.5$ where L is a length of each reproduced mark obtained by reproducing the recorded marks; and $v_0$ is any scanning speed selected to satisfy the existence ratio of the abnormal marks of $1.0 \times 10^{-4}$ or less.

According to the recording method of the optical recording medium of the first aspect, the length $T_{CPn}$ of the final cooling pulse is optimized so as not to take a temperature history which induces an abnormal crystal growth inherent for a recording layer material of a high-speed correspondence, thereby suppressing the occurrence of the mark length beyond specifications. Further, the length $T_{CPn}$ is specified by two types of continuous functions, and the optimum value of $T_{CPn}$ is easily determined for any scanning speed v, and thus it is possible to easily carry out the recording with high reproduction reliability.

In the recording method of the optical recording medium of the first aspect, preferably, the length $T_{LPn}$ of the final heating pulse, which is the m-th heating pulse, is properly controlled. Preferably, at least one of the $f_{1,n}(v)$ and $f_{2,n}(v)$ is a linear function of the scanning speed v. Preferably, the function of m=n/2 holds if n is an even number and the function of m=(n−1)/2 holds if n is an odd number. Preferably, the functions of $v_H/v_L \geq 2.4$ and $0.4\ v_H \leq v_0 \leq 0.8\ v_H$ are satisfied where a highest recording speed of the medium is represented by $v_H$ and a lowest recording speed of the medium is represented by $v_L$.

In such methods, the parameter $T_{CPn}$ can be determined by a linear function of the scanning speed, therefore the parameter $T_{CPn}$ can be easily determined with few errors. Moreover, this enables decreasing the number of parameters to be pre-formatted in the optical recording medium as compared with complicated functions, and may correspond to high-speed recording at a scanning speed of 20 m/sec or more by using a 2T strategy. Still further, good characteristics can be obtained in the CAV recording because corresponding speed width and the scanning speed $v_0$ are optimized.

In the second aspect of a recording method, there is provided a recording method of an optical recording medium corresponding to different recording speed, which comprises: irradiating the medium with a laser having m pulse sets each comprising a heating pulse of a power Pw and a cooling pulse of a power Pc, in which m is a natural number; and scanning the medium with the laser at a scanning speed v to record marks each of a length nT on the medium, in which n is a natural number of 3 or more, T is a clock cycle, and the relation of m<n is satisfied, wherein: a length $T_{LPn}$ of a final heating pulse, which is the m-th heating pulse, is determined in accordance with the scanning speed v using the following functions (3) and (4), in a range of $v<v_0$, $T_{LPn}/T=g_{1,n}(v)$            Function (3)

in a range of $v \geq v_0$, $T_{LPn}/T=g_{2,n}(v)$           Function (4)

where the $g_{1,n}(v)$ and $g_{2,n}(v)$ each represents a continuous function of the scanning speed v to satisfy the relation of $g_{1,n}(v_0) > g_{2,n}(v_0)$; the $g_{1,n}(v)$ and $g_{2,n}(v)$ each satisfies the condition where an existence ratio of abnormal marks, which is a ratio of the number of abnormal marks to the number of normal marks, is $1.0 \times 10^{-4}$ or less, the normal mark satisfying the requirement of $L/nT \geq n-0.5$ and the abnormal mark satisfying the requirement of $L/nT < n-0.5$ where L is a length of each reproduced mark obtained by reproducing the recorded marks; and $v_0$ is any scanning speed selected to satisfy the existent ratio of the abnormal marks of $1.0 \times 10^{-4}$ or less.

According to the recording method of the optical recording medium of the second aspect, the length $T_{LPn}$ of the final heating pulse is optimized so as not to take a temperature history which induces an abnormal crystal growth inherent for a recording layer material of a high-speed correspondence, thereby suppressing the occurrence of the mark length beyond specifications. Further, the length $T_{LPn}$ is specified by two types of continuous functions, and the optimum value of $T_{LPn}$ is easily determined for any scanning speed v, and thus it is possible to easily carry out the recording with high reproduction reliability.

In the recording method of the optical recording medium of the second aspect, preferably, the length $T_{CPn}$ of the final cooling pulse, which is the m-th cooling pulse, is properly controlled. Preferably, at least one of the $g_{1,n}(v)$ and $g_{2,n}(v)$ is a linear function of scanning speed v.

Preferably, the function of m=n/2 holds if n is an even number and the function of m=(n−1)/2 holds if n is an odd number. Preferably, the functions of $v_H/v_L \geq 2.4$ and $0.4\ v_H \leq v_0 \leq 0.8\ v_H$ are satisfied where a highest recording-scanning speed of the medium is represented by $v_H$ and a lowest recording-scanning speed of the medium is represented by $v_L$.

In such methods, the parameter $T_{LPn}$ can be determined by the linear functions of the scanning speed, therefore the parameter can be easily determined with few errors. Moreover, this enables decreasing the number of parameters to be pre-formatted in the optical recording medium as compared with complicated functions, and may correspond to high-speed recording at a scanning speed of 20 m/sec or more by using a 2T strategy. Still further, good characteristics can be obtained in the CAV recording because corresponding speed width and the scanning speed $v_0$ are optimized.

In the third aspect of a recording method, there is provided a recording method of an optical recording medium corresponding to different recording speed, which comprises: irradiating the medium with a laser having m pulse sets each comprising a heating pulse of a power Pw and a cooling pulse of a power Pc, in which m is a natural number; and scanning the medium with the laser at a scanning speed v to record marks each of a length nT on the medium, in which n is a natural number of 3 or more, T is a clock cycle, and the relation of m<n is satisfied, wherein: both of a length $T_{CPn}$ of a final cooling pulse and a length $T_{LPn}$ of a final heating pulse, which are the m-th cooling pulse and the m-th heating pulse, respectively, are determined in accordance with the scanning speed v using the following functions (1) and (4), in a range of $v<v_0$, $T_{CPn}/T=f1,n\ (v)$         Function (1)

in a range of $v \geq v_0$, $T_{CPn}/T=f2,n\ (v)$         Function (2)

in a range of $v<v_0$, $T_{LPn}/T=g_{1,n}(v)$         Function (3)

in a range of $v \geq v_0$, $T_{LPn}/T=g2,n\ (v)$         Function (4)

where the $f_{1,n}(v)$, $f_{2,n}(v)$, $g_{1,n}(v)$ and $g_{2,n}(v)$ each represents a continuous function of the scanning speed v to satisfy the relations of $f_{1,n}(v_0) > f_{2,n}(v_0)$ and $g_{1,n}(v_0) > g_{2,n}(v_0)$; the $f_{1,n}(v)$, $f_{2,n}(v)$, $g_{1,n}(v)$ and $g_{2,n}(v)$ each satisfies the condition where an existence ratio of abnormal marks, which is a ratio of the number of abnormal marks to the number of normal marks, is $1.0 \times 10^{-4}$ or less, the number of normal mark satisfying the requirement of $L/nT \geq n-0.5$ and the abnormal mark satisfying the requirement of $L/nT < n-0.5$ where L is a length of each reproduced mark obtained by reproducing the recorded marks; and $v_0$ is any scanning speed selected to satisfy the existence ratio of the abnormal marks of $1.0 \times 10^{-4}$ or less.

According to the recording method of the optical recording medium of the third aspect, the length $T_{CPn}$ of the final cooling pulse and the length $T_{LPn}$ of the final heating pulse are optimized so as not to take a temperature history which induces an abnormal crystal growth inherent for a recording layer material of a high-speed correspondence, thereby suppressing the occurrence of the mark length beyond specifications. Further, the length $T_{CPn}$ and the length $T_{LPn}$ are specified respectively by two types of continuous functions, and the optimum values of $T_{CPn}$ and $T_{LPn}$ are easily determined for any scanning speed v, and thus it is possible to easily carry out the recording with high reproduction reliability.

In the recording method of the optical recording medium of the third aspect, preferably, at least one of the $f_{1,n}(v)$ and $f_{2,n}(v)$ and at least one of the $g_{1,n}(v)$ and $g_{2,n}(v)$ are linear functions of the scanning speed v. Preferably, the function of m=n/2 holds if n is an even number and the function of m=(n−1)/2 holds if n is an odd number. Preferably, the functions of $v_H/v_L \geq 2.4$ and $0.4\ v_H \leq v_0 \leq 0.8\ v_H$ are satisfied where a highest recording-scanning speed of the medium is represented by $v_H$ and a lowest recording-scanning speed of the medium is represented by $v_L$.

In the recording method of the optical recording medium according to the present invention, the parameters $T_{CPn}$ and $T_{LPn}$ can be determined by the linear functions of the scanning speed v, therefore the parameters can be easily set up with few errors. Moreover, this enables decreasing the number of parameters to be pre-formatted in the optical recording medium as compared with complicated functions, and may correspond to high-speed recording at a scanning speed of 20 m/sec or more by using a 2T strategy. Still further, good characteristics can be obtained in the CAV recording because corresponding speed width and the scanning speed $v_0$ are optimized.

Further, the present invention provides an optical recording medium. In the first aspect of an optical recording medium, there is provided an optical recording medium which is capable of being recorded using the recording method of the first aspect, wherein information able to univocally decide the $v_0$, $f_{1,n}(v)$ and $f_{2,n}(v)$ is pre-formatted.

In the second aspect of an optical recording medium, there is provided an optical recording medium, which is capable of being recorded using the recording method of the second aspect, wherein information able to univocally decide the $v_0$, $g_{1,n}(v)$ and $g_{2,n}(v)$ is pre-formatted.

In the third aspect of an optical recording medium, there is provided an optical recording medium, which is capable of being recorded using the recording method of the third aspect, wherein information able to univocally decide the $v_0$, $f_{1,n}(v)$, $f_{2,n}(v)$, $g_{1,n}(v)$ and $g_{2,n}(v)$ is pre-formatted.

According to the optical recording medium of any one of the first to third aspects, the appropriate parameters can easily calculated by a recording device because the optimum parameters are pre-formatted in the optical recording media.

Further, the present invention provides an evaluation method of an optical recording medium. In the first aspect of an evaluation method, there is provided an evaluation method of an optical recording medium corresponding to different recording speeds, which comprises:

where marks are recorded on the optical recording medium by: irradiating the medium with a laser having m pulse sets each comprising a heating pulse of a power Pw and a cooling pulse of a power Pc, in which m is a natural number; and scanning the medium with the laser at a scanning speed v to record the marks each of a length nT on the medium, in which n is a natural number of 3 or more, T is a clock cycle, and the relation of m<n is satisfied, performing test recordings by variously changing a length $T_{CPn}$ of a final cooling pulse, which is the m-th cooling pulse; reproducing the test recorded marks; measuring respective lengths L of the reproduced marks; counting normal marks satisfying the requirement of L/nT≧n−0.5 and abnormal marks satisfying the requirement of L/nT<n−0.5; and obtaining an existence ratio of the abnormal marks, which is ratio of the number of the abnormal marks to the number of the normal marks, to evaluate the quality of the optical recording medium.

In the second aspect of an evaluation method, there is provided an evaluation method of an optical recording medium corresponding to different recording speeds, which comprises:

where the optical recording medium is a direct overwrite medium on which marks are recorded by: irradiating the medium the medium with a laser having m pulse sets each comprising a heating pulse of a power Pw and a cooling pulse of a power Pc, in which m is a natural number; and scanning the medium with the laser at a scanning speed v to record the marks each of a length nT on the medium, in which n is a natural number of 3 or more, T is a clock cycle, and the relation of m<n is satisfied, and the recorded marks are erased by: irradiating non-recorded regions of the medium, which are spaces between the marks, with the laser having an erasing pulse of a power Pe, in which the relation of Pw>Pe>Pc is satisfied, performing test recordings by variously changing the power Pe; reproducing the test recorded marks; measuring respective lengths L of the reproduced marks; counting normal marks satisfying the requirement of L/nT≧n−0.5 and abnormal marks satisfying the requirement of L/nT<n−0.5; and obtaining an existence ratio of the abnormal marks, which is a ratio of the number of the abnormal marks to the number of the normal marks, to evaluate the quality of the optical recording medium.

In the evaluation method of the optical recording medium of the first and second aspects, preferably, the test recordings are carried out using a pattern having alternate 3T marks and 3T spaces between the marks in case of n=3. Preferably, the scanning speed is made to be an average value of the highest recording speed and the lowest recording speed of the medium. Preferably, the test recordings are carried out at the lowest recording speed of the medium using a pattern having alternate 4T marks and 4T spaces in case of n=4.

BEST MODE FOR CARRYING OUT THE INVENTION

Figure 1A:
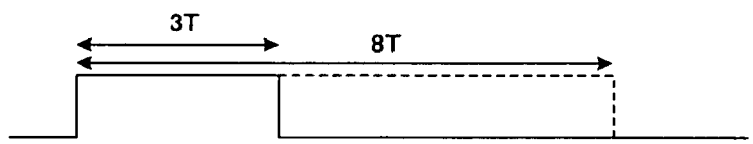
FIG. 1A is a diagram showing NRZI data in 2T strategy.

<Optical Recording Medium and Recording Method of Optical Recording Medium>

In the first embodiment of a recording method of an optical recording medium according to the present invention, a recording method of an optical recording medium corresponding to different recording speeds, comprises:

irradiating the medium with a laser having m pulse sets each comprising a heating pulse of a power Pw and a cooling pulse of a power Pc, in which m is a natural number; and scanning the medium with the laser at a scanning speed v to record marks each of a length nT on the medium, in which n is a natural number of 3 or more, T is a clock cycle, and the relation of m<n is satisfied, wherein:

a length $T_{CPn}$ of a final cooling pulse, which is the m-th cooling pulse, is determined in accordance with the scanning speed v using the following functions (1) and (2), in a range of $v<v_0$, $T_{CPn}/T=f_{1,n}(v)$      Function (1)

in a range of $v≧v_0$, $T_{CPn}/T=f_{2,n}(v)$      Function (2)

where the $f_{1,n}(v)$ and $f_{2,n}(v)$ each represents a continuous function of the scanning speed v to satisfy the relation of $f_{1,n}(v_0)>f_{2,n}(v_0)$;

the $f_{1,n}(v)$ and $f_{2,n}(v)$ each satisfies the condition where an existence ratio of abnormal marks, which is a ratio of the number of abnormal marks to the number of normal marks, is $1.0×10^{-4}$ or less, the normal mark satisfying the requirement of $L/nT≧n-0.5$ and the abnormal mark satisfying the requirement of $L/nT<n-0.5$ where L is a length of each reproduced mark obtained by reproducing the recorded marks; and $v_0$ is any scanning speed selected to satisfy the existence ratio of the abnormal marks of $1.0×10^{-4}$ or less.

In the second embodiment of a recording method of an optical recording medium according to the present invention, a recording method of an optical recording medium corresponding to different recording speeds, comprises:

irradiating the medium with a laser having m pulse sets each comprising a heating pulse of a power Pw and a cooling pulse of a power Pc, in which m is a natural number; and scanning the medium with the laser at a scanning speed v to record marks each of a length nT on the medium, in which n is a natural number of 3 or more, T is a clock cycle, and the relation of m<n is satisfied, wherein:

a length $T_{LPn}$ of a final heating pulse, which is the m-th heating pulse, is determined in accordance with the scanning speed v using the following functions (3) and (4), in a range of $v<v_0$, $T_{LPn}/T=g_{1,n}(v)$      Function (3)

in a range of $v≧v_0$, $T_{LPn}/T=g_{2,n}(v)$      Function (4)

where the $g_{1,n}(v)$ and $g_{2,n}(v)$ each represents a continuous function of the scanning speed v to satisfy the relation of $g_{1,n}(v_0)>g_{2,n}(v_0)$;

the $g_{1,n}(v)$ and $g_{2,n}(v)$ each satisfies the condition where an existence ratio of abnormal marks, which is a ratio of the number of abnormal marks to the number of normal marks, is $1.0×10^{-4}$ or less, the normal mark satisfying the requirement of $L/nT≧n-0.5$ and the abnormal mark satisfying the requirement of $L/nT<n-0.5$ where L is a length of each reproduced mark obtained by reproducing the recorded marks; and $v_0$ is any scanning speed selected to satisfy the existence ratio of the abnormal marks of $1.0×10^{-4}$ or less.

In the third embodiment of a recording method of an optical recording medium according to the present invention, a recording method of an optical recording medium corresponding to different recording speeds, comprises:

irradiating the medium with a laser having m pulse sets each comprising a heating pulse of a power Pw and a cooling pulse of a power Pc, in which m is a natural number; and scanning the medium with the laser at a scanning speed v to record marks each of a length nT on the medium, in which n is a natural number of 3 or more, T is a clock cycle, and the relation of m<n is satisfied, wherein:

both of a length $T_{CPn}$ of a final cooling pulse and a length $T_{LPn}$ of a final heating pulse, which are the m-th cooling pulse and the m-th heating pulse, respectively, are determined in accordance with the scanning speed v using the following functions (1) and (4), in a range of $v<v_0$, $T_{CPn}/T=f_{1,n}(v)$      Function (1)

in a range of $v≧v_0$, $T_{CPn}/T=f_{2,n}(v)$      Function (2)

in a range of $v<v_0$, $T_{LPn}/T=g_{1,n}(v)$      Function (3)

in a range of $v≧v_0$, $T_{LPn}/T=g_{2,n}(v)$      Function (4)

where the $f_{1,n}(v)$, $f_{2,n}(v)$, $g_{1,n}(v)$ and $g_{2,n}(v)$ each represents a continuous function of the scanning speed v to satisfy the relations of $f_{1,n}(v_0)>f_{2,n}(v_0)$ and $g_{1,n}(v_0)>g_{2,n}(v_0)$;

the $f_{1,n}(v)$, $f_{2,n}(v)$, $g_{1,n}(v)$ and $g_{2,n}(v)$ each satisfies the condition where an existence ratio of abnormal marks, which is a ratio of the number of abnormal marks to the number of normal marks, is $1.0×10^{-4}$ or less, the normal mark satisfying the requirement of $L/nT≧n-0.5$ and the abnormal mark satisfying the requirement of $L/nT<n-0.5$ where L is a length of each reproduced mark obtained by reproducing the recorded marks; and $v_0$ is any scanning speed selected to satisfy the existence ratio of the abnormal marks of $1.0×10^{-4}$ or less.

In the first embodiment of an optical recording medium according to the present invention, an optical recording medium is capable of being recorded using the recording method according to the first embodiment, wherein information able to univocally decide the $v_0$, $f_{1,n}(v)$ and $f_{2,n}(v)$ is pre-formatted.

In the second embodiment of an optical recording medium according to the present invention, an optical recording medium is capable of being recorded using the recording method according to the second embodiment, wherein information able to univocally decide the $v_0$, $g_{1,n}(v)$ and $g_{2,n}(v)$ is pre-formatted.

In the third embodiment of an optical recording medium according to the present invention, an optical recording medium is capable of being recorded using the recording method according to the third embodiment, wherein information able to univocally decide the $v_0$, $f_{1,n}(v)$, $f_{2,n}(v)$, $g_{1,n}(v)$ and $g_{2,n}(v)$ is pre-formatted.

The optical recording method according to the present invention will be described in detail in the following. Details of the optical recording medium according to present invention will be also clarified through the description of the recording method of optical recording medium.

An optical recording medium applied with the recording method of present invention is an optical recording medium having a constant line density of information and must be recordable and rewritable at different recording speed. For recording modes, pulse-width modulation mode in which marks and spaces between the marks having a length nT (wherein n is a natural number and T is a clock cycle) are recorded as information is preferable, and an RLL (Run Length Limited) mode has been generally used in the optical disks. EFM of CD-RW, DVD+RW and EFM+ of DVD-RW are given as their examples. In this case, the recording speed v and the clock cycle T must be taken as v×T=constant to keep the information line density constant. Moreover, v must satisfy the condition of v/r=constant to the disk radius position r in order to correspond to the CAV recording. Accordingly, the recording must be carried out at any speed below the highest recording speed $v_H$ and above the lowest recording speed $v_L$ of the medium to record at any radius position of medium by CAV. It is preferable that $v_H/v_L \geq 2.4$ in case of a 120 mm-diameter optical disk represented by CD, DVD.

In the optical recording medium applied with the recording method of the present invention, information is recorded by irradiating and scanning an intensity-modulated light in the vicinity of a recording layer to generate a phase change between a crystal phase and an amorphous phase in the recording layer material and form amorphous marks. Moreover, it is preferable that an optical disk using a recording layer material with a high crystallization rate is preferable and the highest recording speed $v_H$ is 20 m/s or above.

—Recording Strategies—

The information recording into these optical recording medium corresponding to high-speed recording is carried out by irradiating and scanning intensity-modulated light as described above. These recording methods are generally referred to as "recording strategies". When forming a recording mark having a length nT, the medium is irradiated with a laser having m pulse sets each comprising a heating pulse of power Pw and a cooling pulse of power Pb. At this time, the relation of Pw>>Pb is satisfied. Moreover, it is possible that the power Pw is arbitrarily changed in conformity to the scanning speed in the recording, but the power Pw is set at a power enough to melt the recording layer. The power Pw is preferably in a range of 20 to 40 mW to correspond to 8× speed of DVD+RW. The power Pb must be very low enough to rapidly cool the recording layer melted by the heating pulses, and it is preferably in a range of 0 to 1 mW.

The pulse number m can be arbitrarily set up, and the mark length can be easily controlled by satisfying the relation of m<n. Moreover, the mark length and the pulse number can take a proportional relation by satisfying the relation of m=n−k (k is a natural number of 1 or more), and the control of mark length is further facilitated. For example, the relation of m=n−1 is satisfied in DVD+RW. However, if the recording speed becomes equivalent to the 8× speed of DVD+RW, the clock cycle T becomes 4.8 ns or less. By contrast, the response time of 10 to 90% of existent LDs is as long as 1.5 ns or more and needs 3 ns or more by coming and going. Accordingly, loss is big relative to a light emission cycle of 4.8 ns, thus sufficient heating effect and cooling effect cannot be obtained. Therefore, it is preferable to decrease m to correspond to high-speed recording with a short clock cycle T.

The 2T strategy adopted by Orange Book Part III, volume 3, version 1.1, which is a US Standard Specification of CD-RW, is given as an example of decreasing m.

Figure 1B:
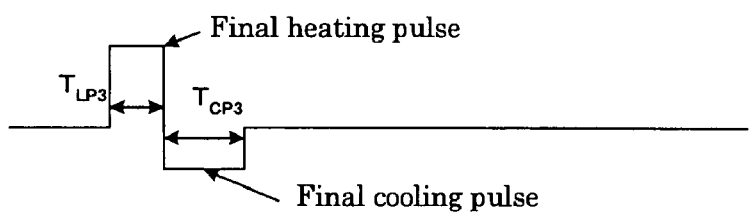
FIG. 1B is a diagram showing a case of n=3 and m=1 in 2T strategy.
Figure 1C:
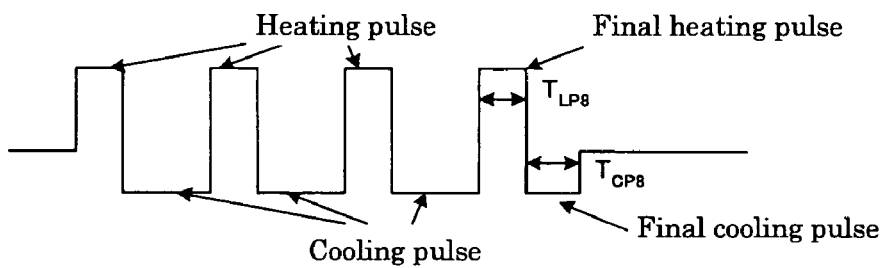
FIG. 1C is a diagram showing a case of n=8 and m=4 in 2T strategy.

An example of the 2T strategy is shown in FIG. 1A to FIG. 1C. FIG. 1A shows NRZ1 (No Return to Zero Inverted) data. FIG. 1B shows a case of n=3, m=1, and FIG. 1C shows a case of n=8, m=4. Namely, in the 2T strategy, the cycle of heating pulses becomes about 2T by taking m=n/2 when n is an even number and m=(n−1)/2 when n is an odd number. As compared with the case of m=n−1, it is possible to melt and rapidly cool the recording layer even in high-speed recording with a short clock cycle T. Moreover, it is preferable to make m≦n/2 to correspond to a high-speed recording of 8× speed or above of DVD.

The length of heating pulse and the length of cooling pulse, i.e. each irradiation time, can be arbitrarily set up, respectively, but it is preferable that appropriate values are set up in accordance with changes of the scanning speed v and the clock cycle T in the recording.

A recording strategy of CD-RW corresponding to the recording and rewriting of 4× speed and to 10× speed is specified in the Orange Book Part III, volume 2, version 1.1 which is a US Standard Specification of CD-RW. At the 4× speed (v=4.8 m/s, T=57.9 ns), the heating pulse=0.2 T, the cooling pulse=0.8 T; at the 8× speed (v=9.6 m/s, T=28.9 ns), the heating pulse=0.4 T, the cooling pulse=0.6 T; at the 10× speed (v=12.0 m/s, T=23.1 ns), the heating pulse=0.5 T, the cooling pulse=0.5 T. Namely, the higher the speed, the longer the length of heating pulse to the clock cycle and the shorter the length of cooling pulse to the clock cycle. The dependence to the v becomes a proportional relation.

The heating pulse width relative to 1× speed to 2.4× speed is specified by a proportional expression of the scanning speed v in DVD+ReWritable 4.7 Gbytes Basic Format Specifications System Description, version 1.2 which is a standard specification of DVD+RW.

Moreover, the respective lengths of heating pulse and cooling pulse can be described with optimum recording parameters at arbitrary recording velocities by describing the lengths with continuous functions of scanning speed v in Japanese Laid-Open Patent Application (JP-A) 2000-322740, JP-A 2001-118245 and JP-A 2001-243626.

If v is decided in a recording speed region, i.e., a speed region of $v_L \leq v \leq v_H$, the lengths of heating pulse and cooling pulse can be uniquely decided in all these techniques.

However, these techniques are not applicable in the optical recording medium using the above-mentioned recording layer material able to correspond to the $v_H \geq 20$ m/s. Although the crystallization rate of the recording layer material must be increased to correspond to the high-speed recording, the time for irradiating a light on an optical recording medium is inevitably shortened (inversely proportioned to the scanning speed) by accelerating the scanning speed in the recording. As a result, the crystallization or the amorphous phase formation must be carried out in a shorter time. Because the amorphous phase formation is carried out by rapidly cooling the recording layer, it is not inconvenient from the fact that the higher the scanning speed, the easier the layer is quenched, but the crystallization must be slowly cooled, therefore it becomes difficult if the irradiation time is shortened. For this reason, it is preferable that the crystallization be made in a shorter irradiation time by increasing the crystallization rate of a recording layer material.

Figure 2A:
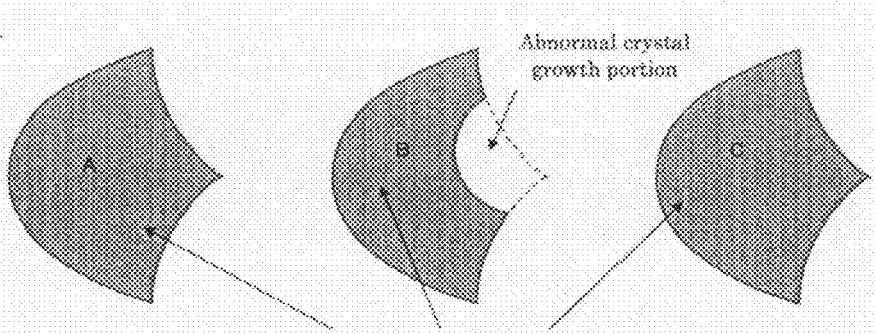
FIG. 2A is a schematic diagram showing the shape of recording marks in an example of abnormal crystal growth.
Figure 2B:
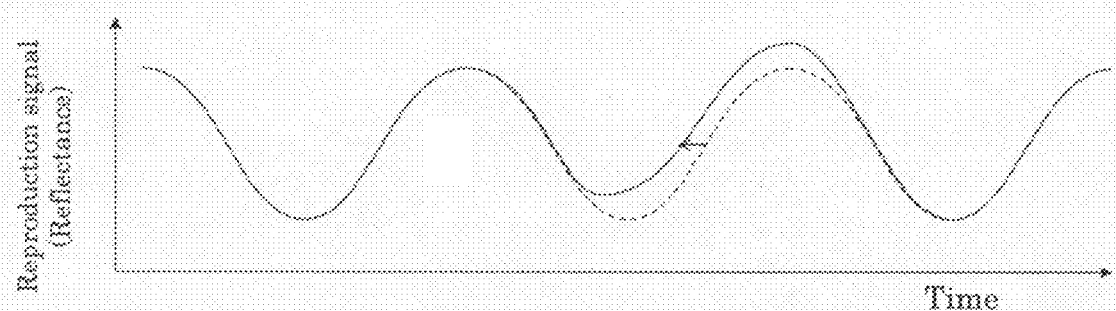
FIG. 2B is a diagram showing a reproduction signal in case abnormal crystal growth exists.

However, abnormal crystal growth occurs easily due to a little difference of recording conditions in the recording layer material having such a high crystallization rate. An example of abnormal crystal growth is schematically shown in FIG. 2A. FIG. 2A shows the recorded marks in the case where the recording is carried out by a recording strategy shown in FIG. 1B using a pattern having alternate 3T marks and 3T spaces. (It is possible that the mark shape is observed by a transmission electron scope.) As shown in FIG. 2A, marks A and marks C are normal recording marks, and abnormal crystal growth occurs at the end of marks B. A reproduction signal in case of such abnormal crystal growth distorts to the normal case (dotted line) as shown in FIG. 2B. As a result, a signal after binarization is as shown in like FIG. 2C, and only the marks B with abnormal crystal growth is reproduced in shorter than 3T.

Figure 2C:
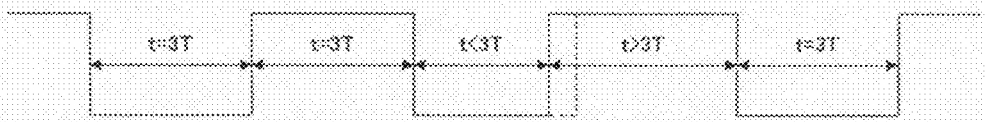
FIG. 2C is a diagram showing a binaryzed signal in an example of abnormal crystal growth.
Figure 3:
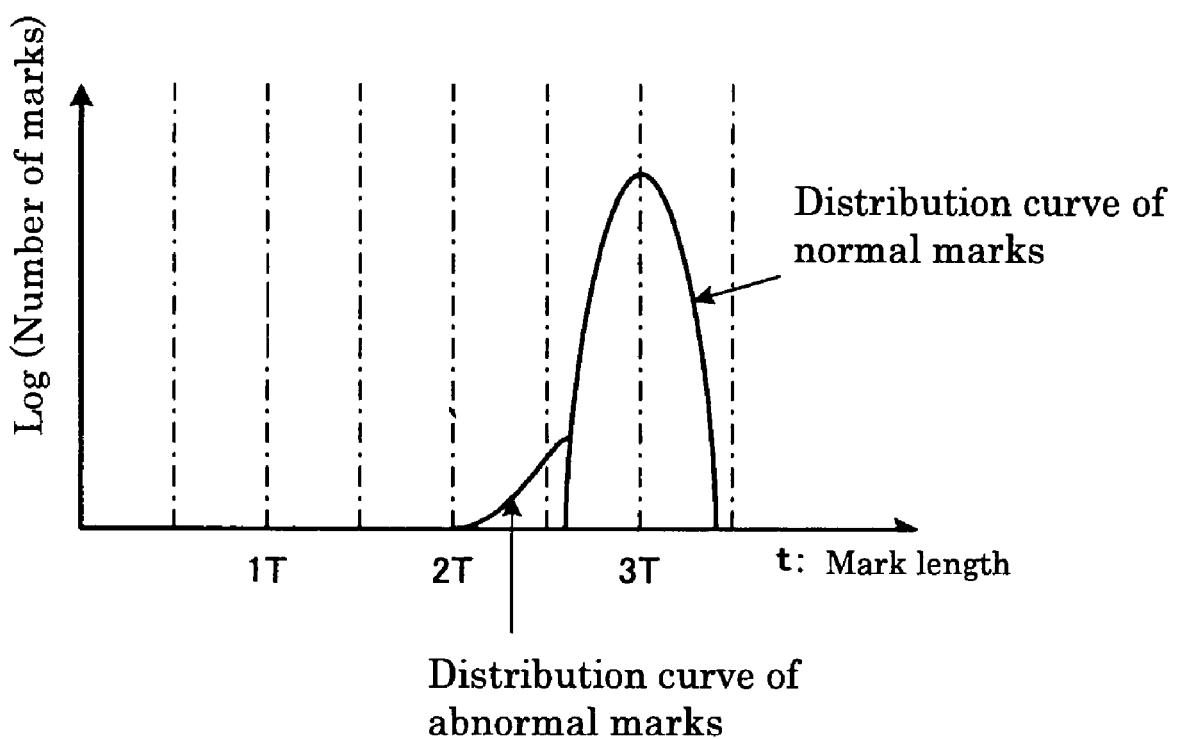
FIG. 3 is a graph showing a result from measuring a binaryzed signal of FIG. 2C by TIA.

If the signal after binarization of FIG. 2C is measured by TIA (Time Interval Analysis) to analyze the rate of occurrence of marks B, a result such as that shown in FIG. 3 can be obtained. Namely, it is divided into a component making a normal distribution with 3T as central value and a component distributing in a shorter side. This component distributing in the shorter side is caused by abnormal crystal growth. If a ratio of the number of marks having abnormal crystal growth (abnormal marks) to the number of marks having normal distribution (normal marks) is taken, it has been found that the ratio greatly depends upon the recording speed v, the length $T_{LP3}$ of final heating pulse and the length $T_{CP3}$ of final cooling pulse.

Figure 4:
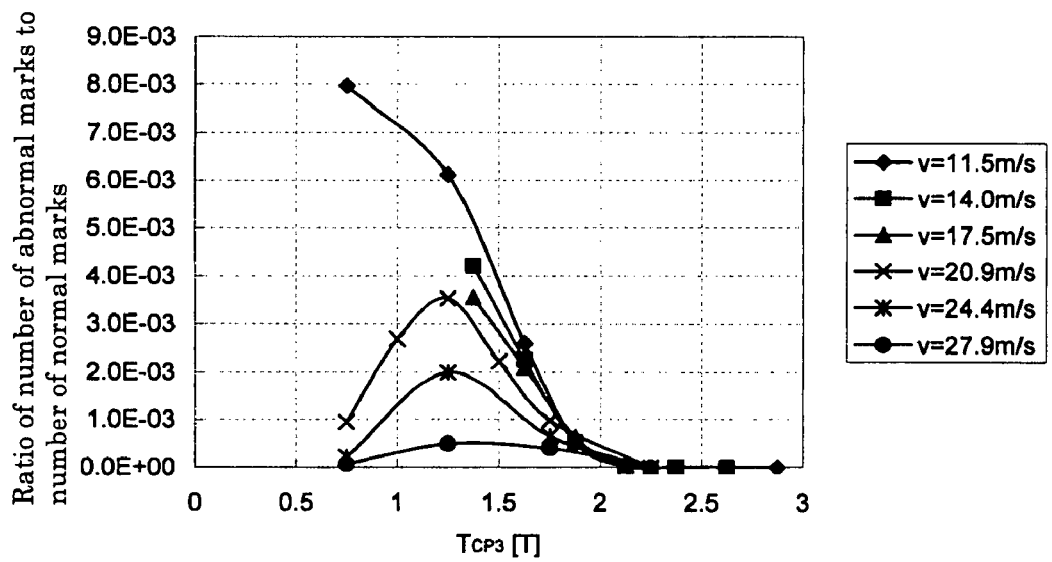
FIG. 4 is a graph showing the dependence of the existence ratio of abnormal marks on $T_{CP3}$ and v.
Figure 5:
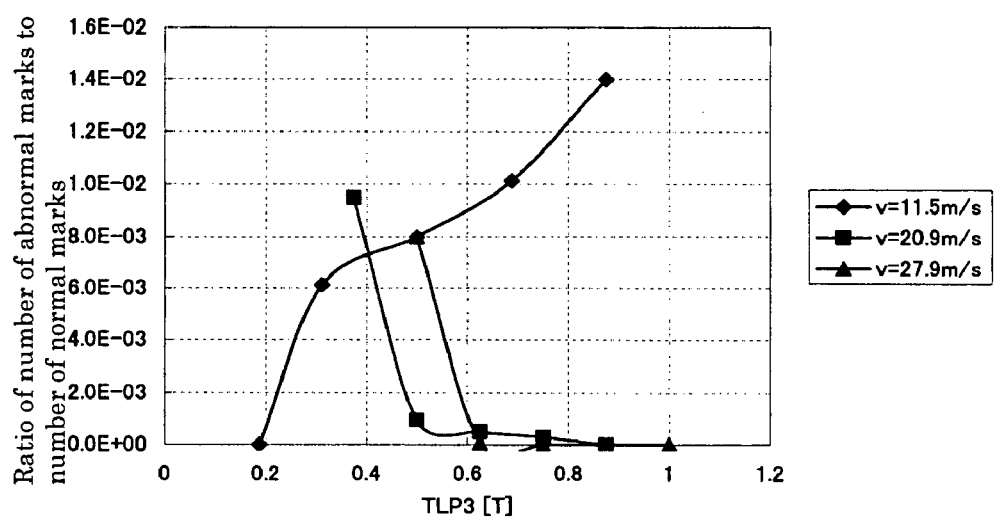
FIG. 5 is a graph showing the dependence of the existence ratio of abnormal marks on $T_{LP3}$ and v.

The dependence of the existence ratio of abnormal marks, i.e., the ratio of the number of abnormal marks to the number of normal marks, on $T_{CP3}$, and v is shown in FIG. 4. The dependence of the existence ratio of abnormal marks on $T_{LP3}$ and v is shown in FIG. 5. An optical recording medium used for the measurement is a sample recordable until 8× speed of DVD+RW (i.e., $v_H$=27.9 m/s). The existence ratio of abnormal marks becomes very high in some range of T at all recording velocities. The abnormal marks become a signal beyond the specification in reproduction as described above, therefore they become a reason for reading errors. If the existence ratio is more than $1.0\times10^{-4}$, a possibility of becoming uncorrectable errors is high, thus the reliability of reproduction signal greatly reduces.

A method for measuring the $T_{CPn}$ dependence of an existence ratio of abnormal marks is explained below.

The existence ratio is measured by carrying out the recording of a pattern in which nT marks and nT spaces are alternately arrayed. At this time, the $T_{LPn}$ can be arbitrarily set up in accordance with v, but it is preferable that characteristics such as degree of modulation, asymmetry, jitter, etc. are optimized to better values, and it is preferable that the $T_{LPn}$ is set to an irradiation time substantially the same as other pulses of a pulse train, i.e., the first pulse to (m−1)th pulse. At this time, the $T_{LPn}$ may be set using a continuous function or using two functions in accordance with the scanning speed v.

Optimum recording powers are set for the irradiation power and the erasure power of heating pulses. The optimum recording powers may use the pre-formatted information on the optical recording medium or may be set up by OPC (Optimum Power Control).

The scanning speed is set at the scanning speed $v_0$ at which a function used for setting the $T_{CPn}$ is changed from the function (1) to the function (2) described hereinafter. At this time, the clock cycle T must also be properly set up in conformity to the scanning speed.

The test recordings are carried out by the above settings at a variety of $T_{CPn}$. The range of varying $T_{CPn}$ is arbitrarily settable, but a range of 0T to 3T is preferable. If the setting is too long, a possibility of deviating tracking and focusing increases because the cooling pulse lengthens and the irradiation time with a low power prolongs.

When the recorded region is reproduced to count the number of abnormal marks, an appropriate binarization unit and a time interval analyzer are used as described above. Analysis result of time interval analyzer is as shown in FIG. 3 (example of n=3). Here, mark with a length less than (n−0.5)T is counted as abnormal mark. In contrast, mark with a length in a range of (n±0.5)T is counted as normal mark.

The abnormal mark ratio is calculated by taking the ratio of the number of abnormal marks to the number of normal marks.

Figure 17:
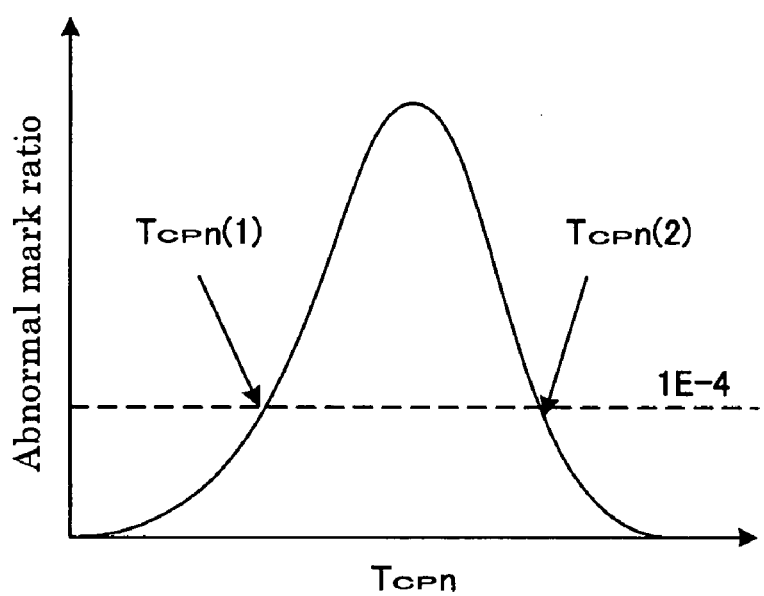
FIG. 17 is a graph schematically showing the dependence of the existence ratio of abnormal marks on $T_{CPn}$.

The dependence of the existence ratio of abnormal marks thus measured is schematically shown in FIG. 17.

A range where the existence ratio is $1.0\times10^{-4}$ or less can be found in the following two cases (1) and (2).

$$T_{CPn} \leq T_{CPn}(1) \quad (1)$$

$$T_{CPn} \geq T_{CPn}(2) \quad (2)$$

Appropriate values of $T_{CPn}$ are set up within respective ranges of the (1) and (2), the continuous functions $f_{1,n}$ and $f_{2,n}$ are set up so that the requirement of $T_{CPn}/T=f_{1,n}(v_0)$ in the case (1) and the requirement of $T_{CPn}/T=f_{2,n}(v_0)$ in the case (2) are satisfied. The respective continuous functions must be set up so that good characteristics at the lowest recording speed and the highest recording speed can be obtained.

The $T_{LPn}$ and the functions $g_{1,n}$, $g_{2,n}$ can be set up in the same manner.

Figure 6:
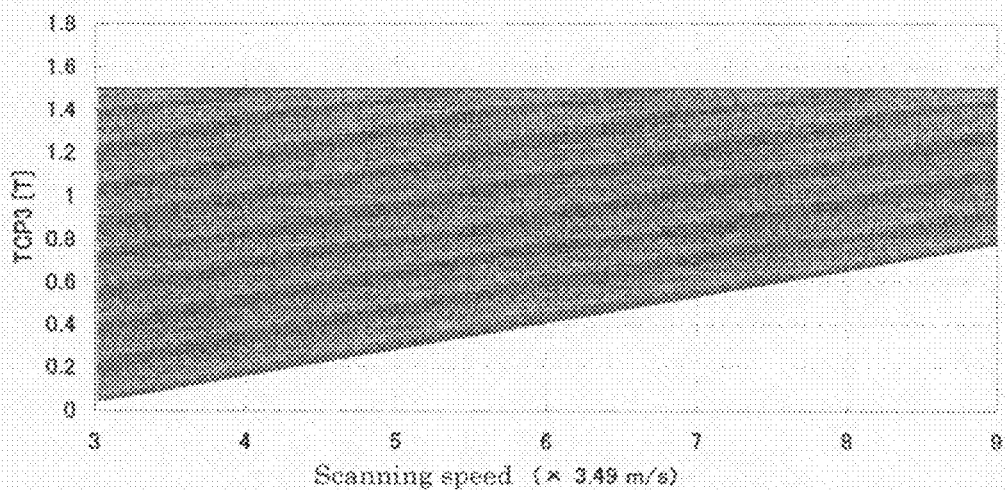
FIG. 6 is a graph showing ranges of v and $T_{CP3}$ when abnormal marks are more than $1.0 \times 10^{-4}$.

FIG. 6 shows the ranges of the $T_{CP3}$ and v when the existence ratio of abnormal marks is more than $1.0\times10^{-4}$. In a grey region in FIG. 6, the existence ratio of abnormal marks is high, therefore the $T_{CP3}$ can not be determined. Here, if attention is paid to a point of 3.3× speed (v=11.5 m/s), a settable range of $T_{CP3}$ is limited to $T_{CP3}>1.5T$. On the other hand, two kinds of solutions of $T_{CP3}>1.5T$ and $T_{CP3}<0.6T$ are permitted at the 8× speed (v=27.9 m/s), but $T_{CP3}>1.5T$ results in the impossibility of a normal recording and a high asymmetry because the mark length becomes too long. Accordingly, $T_{CP3}<0.6T$ must be taken.

Here, in order to correspond to the CAV recording, it is necessary that any recording speeds in a range of 3.3× to 8× velocities (11.5-27.9 m/s) can be set. An interpolation method wherein a continuous function is simply interpolated between the set values of $T_{CPn}$ at 3.3× and 8× speeds is generally used in the conventional art. An example thereof is shown in FIG. 7.

Figure 7:
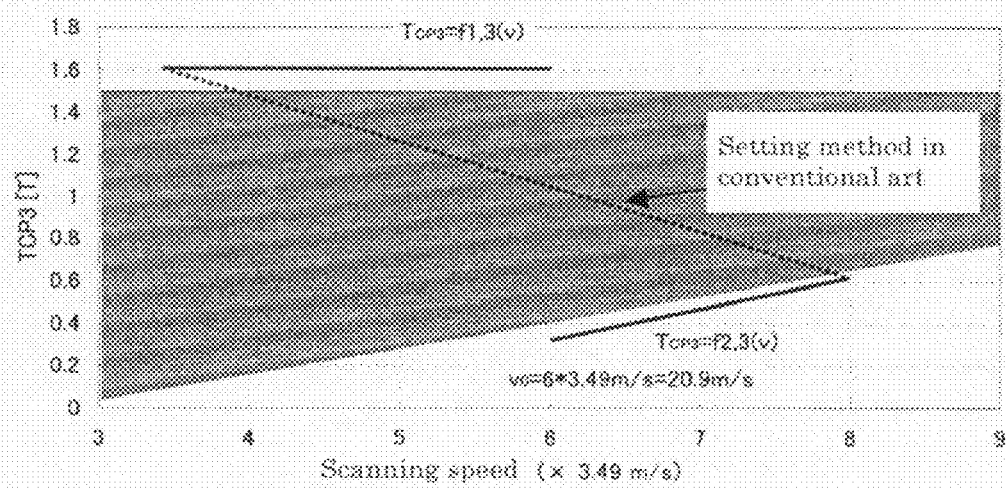
FIG. 7 is a graph illustrating parameter setting methods according to the present invention and conventional art.

The parameter $T_{CP3}$ setting method in conventional art is shown by a broken line of FIG. 7. A case of the simplest linear function is shown as an example. In this case, at a middle speed, the parameter $T_{CP3}$ must be set within the range of high existence ratio of abnormal marks, resulting in the significant deterioration of the reproduction reliability of recorded signal.

Contrarily, in the recording method of the optical recording medium according to the present invention, the parameter $T_{CPn}$ is set at a value out of the region of the high existence ratio of abnormal marks. Namely, a function used for setting the parameter is changed from the following function (1) to the following function (2) at a certain middle speed $v_0$ ($v_L \leq v_0 \leq v_H$), thereby the parameter can be set at a value out of the region of the high existence ratio of abnormal marks.

Namely, in the present invention, the length $T_{CPn}$ of the final cooling pulse is determined using the following functions, in a range of $v<v_0$, $T_{CPn}/T=f1,n(v)$      Function (1)

in a range of $v≧v_0$, $T_{CPn}/T=f2,n(v)$      Function (2)

where both the $f_{1,n}(v)$ and $f_{2,n}(v)$ are continuous functions of v to satisfy the relation of $f_{1,n}(v_0)>f_{2,n}(v_0)$, resulting in the avoidance of a high-error region.

FIG. 7 shows an example in the case of n=3, i.e., $T_{CP3}$. The parameter setting method of the present invention is shown by a solid line in FIG. 7, where $v_H$=27.9 m/s, $v_L$=11.5 m/s, and $v_0$=20.9 m/s.

The region of the high existence ratio of abnormal marks can be avoided by changing the setting values $T_{CP3}$ greatly and discontinuously at $v=v_0$.

Although the speed $v_0$ at which a function used for setting the $T_{CP3}$ is changed from the function (1) to the function (2) can be arbitrarily set, the speed should be so selected that good characteristics, such as jitter characteristic, degree of modulation can be obtained, wherein the $T_{CPn}$ is set at a value out of the region of the high existence ratio of abnormal marks. Accordingly, the speed is preferably in a range of 0.4 $v_H≦v_0≦0.8\ v_H$.

For the continuous functions $f_{1,n}(v)$ and $f_{2,n}(v)$, aforesaid relation must hold at $v=v_0$, but an arbitrary function system can be set up. It is more preferable to take the functions as linear functions, respectively, to facilitate the setting of the parameter.

With respect to the length $T_{LPn}$ of final heating pulse, the same method is also applicable.

Namely, when the $T_{LPn}$ is set using the following functions (3) and (4), in a range of $v<v_0$, $T_{LPn}/T=g_{1,n}(v)$      Function (3)

in a range of $v≧v_0$, $T_{LPn}/T=g_{2,n}(v)$      Function (4)

where both the $g_{1,n}(v)$ and $g_{2,n}(v)$ are continuous functions of v to satisfy the relation of $g_1(v_0)<g_2(v_0)$, it enables greatly decreasing the number of abnormal marks at a middle recording speed.

Any function system may be used for $g_{1,n}(v)$ and $g_{2,n}(v)$, but the setting of the parameter can be easily carried out by taking the system as linear functions. Although the speed $v_0$ at which the function used for setting the $T_{CP3}$ is changed from the function (3) to the function (4) can be arbitrarily set, the speed should be so selected that good characteristics, such as jitter characteristic, degree of modulation can be obtained, wherein the $T_{LPn}$ is set at a value out of the region of the high existence ratio of abnormal marks. Accordingly, the speed is preferably in a range of 0.4 $v_H≦v_0≦0.8\ v_H$.

It is possible to decrease the number of abnormal marks by setting either one of the $T_{CPn}$ and the $T_{LPn}$ using one continuous function for the scanning speed v and setting the other using two functions or by setting both of the $T_{CPn}$ and the $T_{LPn}$ using two functions. Which parameters are set using two functions are decided by seeing whether the number of abnormal marks and basic recording signal characteristics (jitter, asymmetry, etc.) are in the desired ranges or not.

<Optical Recording Medium>

As described above, the occurrence of abnormal marks greatly depends upon material properties such as the crystallization rate, etc. of a recording layer material. Accordingly, information capable of specifying $v_0$, $f_{1,n}(v)$, $f_{2,n}(v)$, $g_{1,n}(v)$ and $g_{2,n}(v)$ may be pre-formatted on an optical recording medium in advance. For example, when the following functions are satisfied;

$f_{1,n}(v)=a_1 \times v + b_1$ $f_{2,n}(v)=a_2 \times v + b_2$, wherein $a_1$, $b_1$, $a_2$, $b_2$ are inherent constants of optical recording medium, the information showing $a_1$, $b_1$, $a_2$, $b_2$ and $v_0$ is pre-formatted on the optical recording medium in advance.

As a pre-formatting method used in the present technique, for example, ATIP Extra Information of CD-RW and Physical Information of DVD+RW, etc. are given. If the above information are pre-formatted on each optical recording medium, a recording device can acquire optimum recording parameters from the pre-formatted information.

<Evaluation Method of Optical Recording Medium>

In the first embodiment of an evaluation method of an optical recording medium according to the present invention, where marks are recorded on the optical recording medium by: irradiating the medium with a laser having m pulse sets each comprising a heating pulse of a power Pw and a cooling pulse of a power Pc, in which m is a natural number; and scanning the medium with the laser at a scanning speed v to record the marks each of a length nT on the medium, in which n is a natural number of 3 or more, T is a clock cycle, and the relation of m<n is satisfied, an evaluation method of an optical recording medium corresponding to different recording speeds, comprises: performing test recordings by variously changing a length $T_{CPn}$ of a final cooling pulse, which is the m-th cooling pulse; reproducing the test recorded marks; measuring respective lengths L of the reproduced marks; counting normal marks satisfying the requirement of L/nT≧n−0.5 and abnormal marks satisfying the requirement of L/nT<n−0.5; and obtaining an existence ratio of the abnormal marks, which is a ratio of the number of the abnormal marks to the number of the normal marks, to evaluate the quality of the optical recording medium.

In the second embodiment of an evaluation method of an optical recording medium according to the present invention, where the optical recording medium is a direct overwrite medium on which marks are recorded by: irradiating the medium the medium with a laser having m pulse sets each comprising a heating pulse of a power Pw and a cooling pulse of a power Pc, in which m is a natural number; and scanning the medium with the laser at a scanning speed v to record the marks each of a length nT on the medium, in which n is a natural number of 3 or more, T is a clock cycle, and the relation of m<n is satisfied, and the recorded marks are erased by: irradiating non-recorded regions of the medium, which are spaces between the marks, with the laser having an erasing pulse of a power Pe, in which the relation of Pw>Pe>Pc is satisfied, an evaluation method of an optical recording medium corresponding to different recording speeds, comprises: performing test recordings by variously changing the power Pe; reproducing the test recorded marks; measuring respective lengths L of the reproduced marks; counting normal marks satisfying the requirement of L/nT≧n−0.5 and abnormal marks satisfying the requirement of L/nT<n−0.5; and; obtaining an existence ratio of the abnormal marks, which is a ratio of the number of the abnormal marks to the number of the normal marks, to evaluate the quality of the optical recording medium.

As described above, the abnormal crystal growth greatly depends upon the material properties of a recording layer material, such as a crystallization rate and thermal properties, and recording methods, i.e., the setting method of the $T_{LPn}$ and the $T_{CPn}$. When a phase-changing material, for example, an alloy, is used for the recording layer material, the number of abnormal marks can be decreased if the purity and compositional ratio of constituent elements are properly controlled. However, in general, a disk is a multilayer structure of thin films, so the number of abnormal marks also fluctuates with the film-formed state of respective layers. Namely, the thermal capacity and thermal conductivity of respective layers fluctuate with varying the thickness and film quality of layers, leading to variations of the thermal medium designs. The variations of thermal medium design sometimes has an affect similar to changing recording methods, therefore the variations of the thermal medium design affects a rise in the number of abnormal marks, etc. Accordingly, an adequate evaluation method becomes necessary for realizing a stabilized production of medium.

A specific evaluation method will be described below.

When an optical recording medium is inspected, the sensitivity is bad and an adequate inspection is extremely difficult in the case of using the optimum recording condition, i.e., a recording condition with few abnormal marks. Namely, even if a deviation from an objective thermal design occurs, the increase in number of abnormal marks is only a little and therefore does not exceed measuring errors in many cases. Therefore, an evaluation method with an even better sensitivity is needed.

Figure 20:
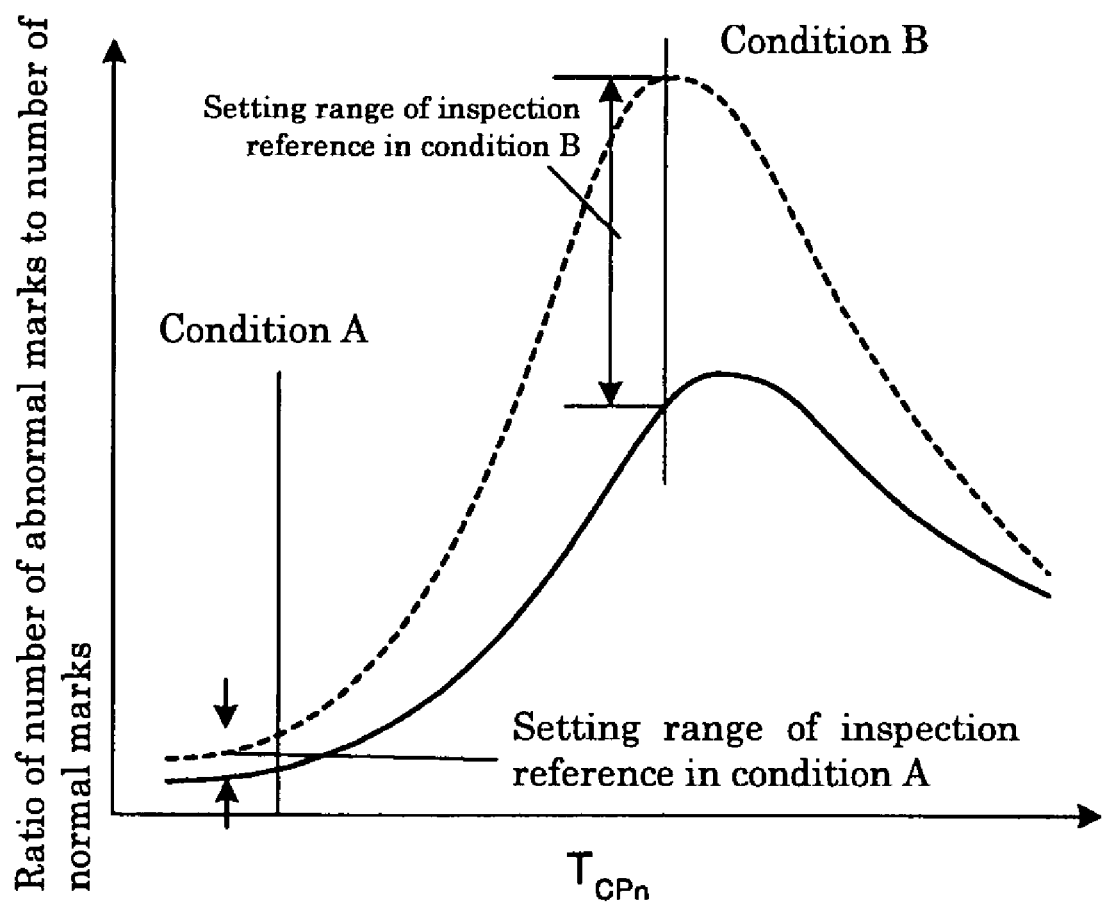
FIG. 20 is a graph schematically showing the dependence of the ratio of the number of abnormal marks to the number of normal marks on $T_{CPn}$.

The dependence of the abnormal mark ratio on the setting value of the $T_{CPn}$ is shown in FIG. 17. The dependence in case disk characteristics fluctuate is shown in FIG. 20. The abnormal mark ratio for a normal disk is expressed by a solid line. The abnormal mark ratio in case disk characteristics deviate is shown by a broken line.

As described above, the condition with a very low number of abnormal marks (condition A) is the optimum condition for the recording parameter $T_{CPn}$. However, when disk fluctuates in the optimum condition, a fluctuation of the number of abnormal marks is small. Therefore, an inspection reference setting range in case of inspecting the fluctuation of disk in the optimum condition becomes a very narrow region. Thus, if the $T_{CPn}$ in the small fluctuation region of the number of abnormal marks is used as inspection parameters, it causes a significant deterioration of inspection accuracy when measuring errors occur.

In contrast, the case of the $T_{CPn}$ in a high number of abnormal marks (condition B) enables adopting a broad setting range of inspection reference because of the large fluctuation of the number of abnormal marks. Moreover, the inspection accuracy does not significantly deteriorate even if measuring errors occur.

Considering the above points, accomplishing inspection in a state in which the recording conditions are intentionally deviated from the optimum conditions enables setting up an inspection condition able to accurately judge the fluctuation of medium.

Any parameters can be given as parameters to be deviated intentionally for the inspection, but a parameter exerting a large effect on the number of abnormal marks is preferably chosen, for example, the $T_{CPn}$ or Pe/Pw which is the ratio of erasure power Pe and recording power Pw is given.

Moreover, any data can be used as recording data in the inspection. In order to improve the inspection accuracy, it is more preferable to record a pattern having alternate marks and spaces each having the same length than a random data pattern having alternate marks and spaces having random lengths, enabling reducing the effect of interference between symbols (a phenomenon in which the length of adjacent mark or space affect a reproduction signal), thus the case is more preferable.

Furthermore, in the case of using the pattern with marks and spaces each having the same length, the length can be arbitrary set, but it is preferable to set up the most efficient length for recording speed. More preferably, the recording is carried out using a pattern with marks and spaces each having a length as short as possible, resulting in the increase of the number of samples for the evaluation even in the same reproducing length. Thereby, the accuracy is further improved. As examples of the pattern, a pattern having alternate 3T marks and spaces, a pattern having alternate 4T marks and spaces are given.

According to the present invention, the recording can be easily carried out with high reliability while suppressing the occurrence of mark lengths beyond the specification because the length of the final heating pulse and/or the length of the final cooling pulse are specified by two kinds of continuous functions, and the optimum values of the length of the final heating pulse and/or the length of the final cooling pulse can be easily determined for an arbitrary scanning speed.

The present invention will be explained more concretely by examples and comparative examples, but the present invention is not limited to the examples.

EXAMPLE 1

Since there was no DVD medium corresponding to a high-speed recording of 20 m/sec or above in the market, a sample disk was prepared.

A 60 nm-thick lower protective layer made of a mixture of ZnS and SiO2, a 15 nm-thick recording layer made of a GaSbSnGe alloy, a 10 nm-thick upper protective layer made of a mixture of ZnS and SiO2 and a 200 nm-thick reflective layer made of Ag were successively laminated on a 0.6 mm-thick and 120 mm-diameter polycarbonate DVD+RW substrate having a spiral continuous group of 0.74 μm track pitch by sputtering process. Further, another substrate was pasted on the reflective layer with a commercial UV resin adhesive for optical disk to make it into a 1.2 mm-thick disk. The shape fully satisfied the specification of DVD+RW.

Subsequently, the recording layer was crystallized over the entire surface by an initiation apparatus for a phase-changing type optical disk. The prepared disk was good and satisfied various specifications of DVD+RW in an unrecorded state.

A recording evaluation on the prepared sample disk was carried out by a recording and reproduction evaluation apparatus for DVD+RW (made by Pulstec Industry Inc., DDU1000). The optical pick-up used for recording and reproduction is as follows.

Wavelength: 659 nm

Objective lens NA: 0.65

Irradiation power at reproduction: 0.7 mW

Irradiation power in recording: 1.0 to 40.0 mW

The scanning speed can be set up in a range of 3.49 m/s-30.0 m/s.

A data generator DTG5027 made by Tectronics Co. was used for preparation of a recording strategy. The recording strategy was adopted as the 2T strategy, namely a recording strategy satisfying the condition of n=2 m where n is an even number and the condition of n=2 m+1 where n is an odd number. Here, a pattern having alternate 3T marks and 3T spaces was recorded. Strategy parameters of 3T marks were two, i.e., the heating pulse length $T_{LP3}$ and the cooling pulse length $T_{CP3}$. The recordings were carried out at various recording speeds in the conditions of Table 1.

TABLE 1

| Speed | Scanning speed v (m/s) | Clock cycle T (ns) | TLP3/T | TCP3/T |
|---|---|---|---|---|
| 3.3X | 11.52 | 11.6 | 0.313 | 2.125 |
| 4.0X | 13.96 | 9.6 | 0.375 | 2.125 |
| 5.0X | 17.45 | 7.6 | 0.438 | 2.125 |
| 6.0X | 20.94 | 6.4 | 0.500 | 2.125 |
| 6.0X | 20.94 | 6.4 | 0.500 | 0.500 |
| 7.0X | 24.43 | 5.5 | 0.563 | 0.625 |
| 8.0X | 27.92 | 4.8 | 0.625 | 0.750 |

Figure 8:
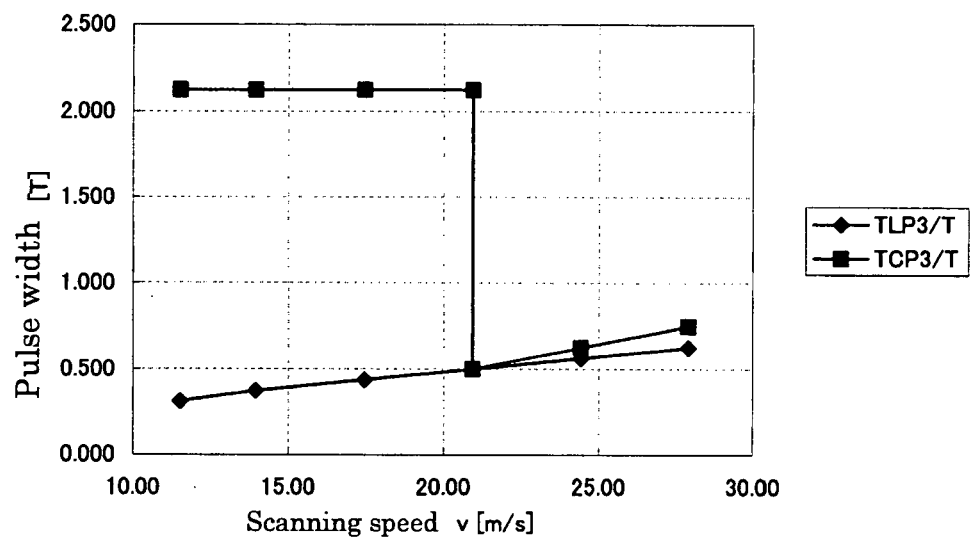
FIG. 8 is a graph showing the dependence of pulse length on scanning speed in Example 1.

Moreover, the dependence of the parameters $T_{LP3}$ and $T_{CP3}$ on scanning speed is shown in FIG. 8.

In case of $v_0$=20.94 m/s, $T_{CP3}/T$ can be described by the following functions, $$v<v_0,\ T_{CP3}/T=f_{1,3}(v)=2.125$$

$$v \geq v_0,\ T_{CP3}/T=f_{2,3}(v)=0.036v-0.25$$

where the relation of $f_{1,3}(v_0)>f_{2,3}(v_0)$ was satisfied.

Figure 9:
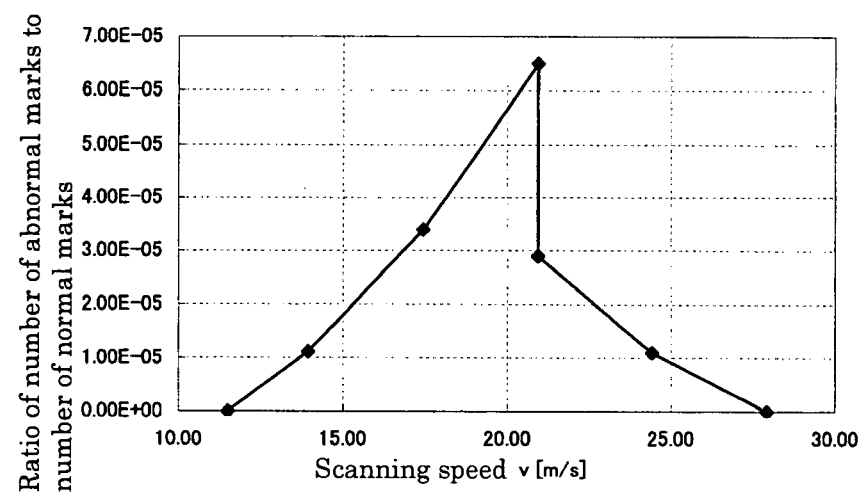
FIG. 9 is a graph showing the dependence of the ratio of the number of abnormal marks to the number of normal marks on scanning speed in Example 1.

In the recording by this method, the dependence of the ratio of the number of abnormal marks to number of normal marks on scanning speed was obtained. The result is shown in FIG. 9. The existence ratio of abnormal marks was $1.0\times10^{-4}$ or less in a speed range of 11.52 m/s to 27.92 m/s, thus good reproduction reliability was obtained.

COMPARISON EXAMPLE 1

For a sample disk same as Example 1, the recording was carried out using the same manner as Example 1, except for using the parameters of Table 2, instead of Table 1. As shown Table 2, the parameters $T_{LP3}$ and $T_{CP3}$ were determined using a single continuous function as before.

TABLE 2

| Speed | Scanning speed v (m/s) | Clock cycle T (ns) | TLP3/T | TCP3/T |
|---|---|---|---|---|
| 3.3X | 11.52 | 11.6 | 0.313 | 2.125 |
| 4.0X | 13.96 | 9.6 | 0.375 | 1.850 |
| 5.0X | 17.45 | 7.6 | 0.438 | 1.575 |
| 6.0X | 20.94 | 6.4 | 0.500 | 1.300 |
| 7.0X | 24.43 | 5.5 | 0.563 | 1.025 |
| 8.0X | 27.92 | 4.8 | 0.625 | 0.750 |

Figure 10:
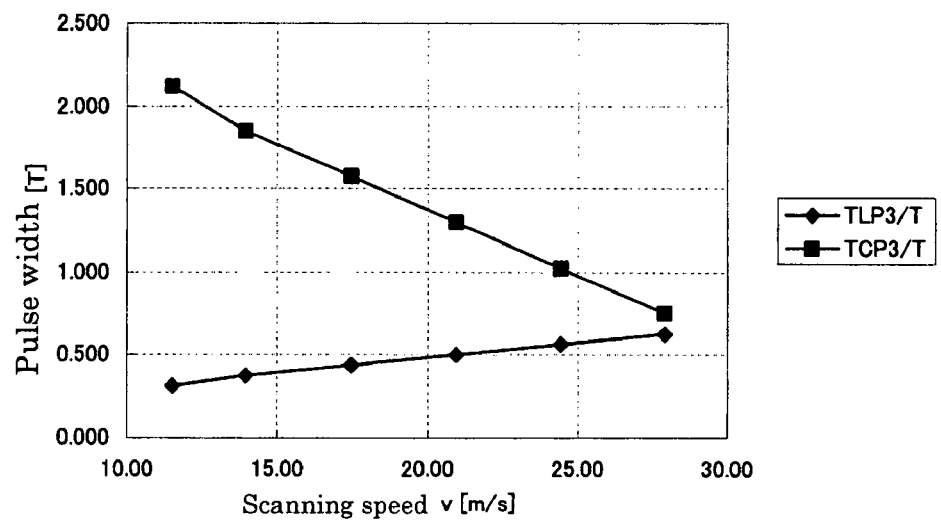
FIG. 10 is a graph showing the dependence of pulse length on scanning speed in Comparison Example 1.
Figure 11:
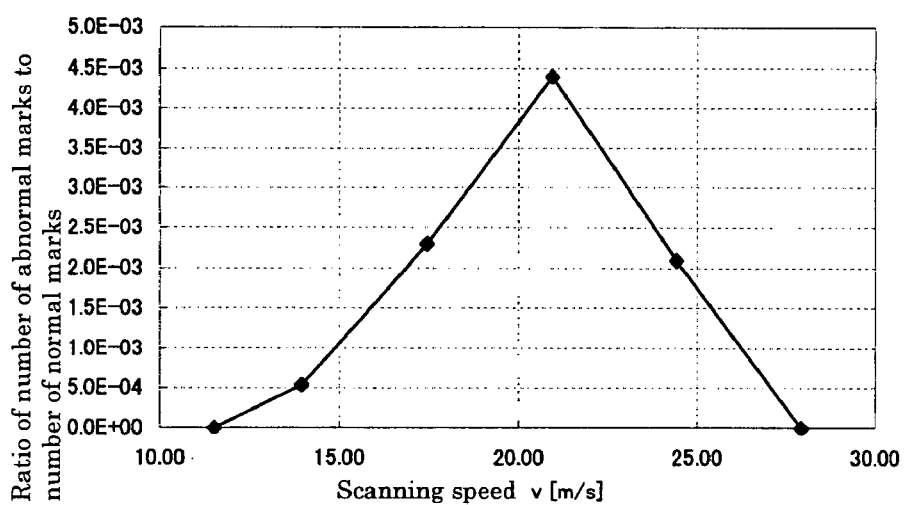
FIG. 11 is a graph showing the dependence of the ratio of the number of abnormal marks to the number of normal marks on scanning speed in Comparison Example 1.

The dependence of the parameters $T_{CP3}$ and $T_{LP3}$ on scanning speed is shown in FIG. 10. Each of two parameters was determined using a continuous linear function. The dependence of the ratio of the number of abnormal marks to number of normal marks on scanning speed is shown in FIG. 11. From the result of FIG. 11, it has been found that except for scanning speeds of 11.52 m/s, 27.92 m/s, the reproduction reliability of recorded information significantly deteriorates because the existence ratio of abnormal marks is more than $1.0\times10^{-4}$.

EXAMPLE 2

For a sample disk same as Example 1, the recording was carried out by the same manner as Example 1, except for using the parameters of Table 3, instead of Table 1.

TABLE 3

| Speed | Scanning speed v (m/s) | Clock cycle T (ns) | TLP3/T | TCP3/T |
|---|---|---|---|---|
| 3.3X | 11.52 | 11.6 | 0.313 | 2.125 |
| 4.0X | 13.96 | 9.6 | 0.328 | 1.850 |
| 5.0X | 17.45 | 7.6 | 0.344 | 1.575 |
| 6.0X | 20.94 | 6.4 | 0.359 | 1.300 |
| 6.0X | 20.94 | 6.4 | 0.625 | 1.300 |
| 7.0X | 24.43 | 5.5 | 0.656 | 1.025 |
| 8.0X | 27.92 | 4.8 | 0.688 | 0.750 |

Figure 12:
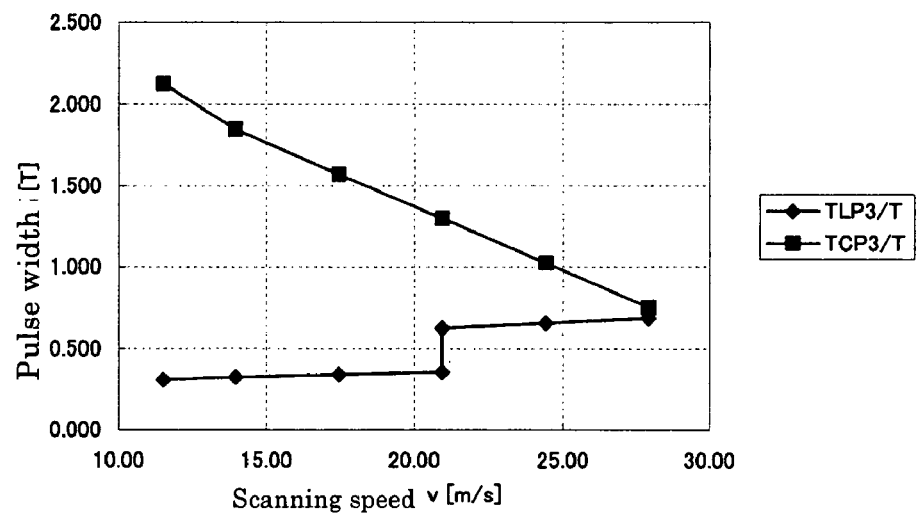
FIG. 12 is a graph showing the dependence of pulse length on scanning speed in Example 2.

The dependence of the parameters $T_{LP3}$ and $T_{CP3}$ on scanning speed is shown in FIG. 12. $T_{CP3}$ was determined using a continuous function, but $T_{LP3}$ was determined using two functions. Namely, in a range of $v<v_0$, $T_{LP3}/T=g_{1,3}(v)=0.00489\ v+0.258$; in a range of $v \geq v_0$, $T_{LP3}/T=g_{2,3}(v)=0.009\ v+0.438$. Moreover, the relation of $g_{1,3}(v_0)<g_{2,3}(v_0)$ was satisfied.

Figure 13:
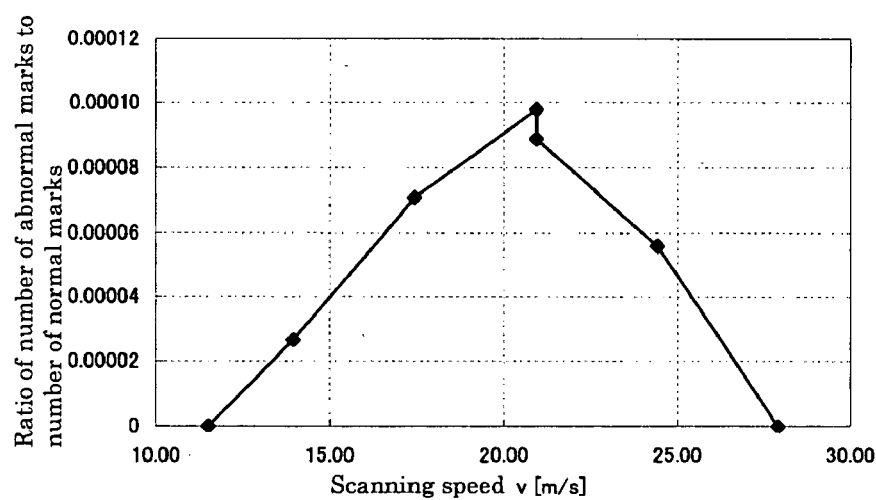
FIG. 13 is a graph showing the dependence of the ratio of the number of abnormal marks to the number of normal marks on scanning speed in Example 2.

The recording was carried out by this recording method, and a result from measuring the number of abnormal marks and number of normal marks is shown in FIG. 13.

The number of abnormal marks increased compared with Example 1, but the existence ratio of abnormal marks was in a range of $1.0\times10^{-4}$ or less. The number of abnormal marks was greatly decreased even if compared with Comparison Example 1.

EXAMPLE 3

For a sample disk same as Example 1, the recording was carried out using the same manner as Example 1, except that a pattern having alternate 10T marks and 10T spaces was recorded by a 2T strategy of n=10 and m=5 and the parameters of Table 4 were used. Here, the length of heating pulses was taken to be the same as the length of final heating pulse, and the same values as those of Example 1 were set.

TABLE 4

| Speed | Scanning speed v (m/s) | Clock cycle T (ns) | TLP3/T | TCP3/T |
|---|---|---|---|---|
| 3.3X | 11.52 | 11.6 | 0.313 | 1.875 |
| 4.0X | 13.96 | 9.6 | 0.375 | 1.750 |
| 5.0X | 17.45 | 7.6 | 0.438 | 1.625 |
| 6.0X | 20.94 | 6.4 | 0.500 | 1.500 |
| 6.0X | 20.94 | 6.4 | 0.500 | 0.500 |
| 7.0X | 24.43 | 5.5 | 0.563 | 0.250 |
| 8.0X | 27.92 | 4.8 | 0.625 | 0.000 |

Figure 14:
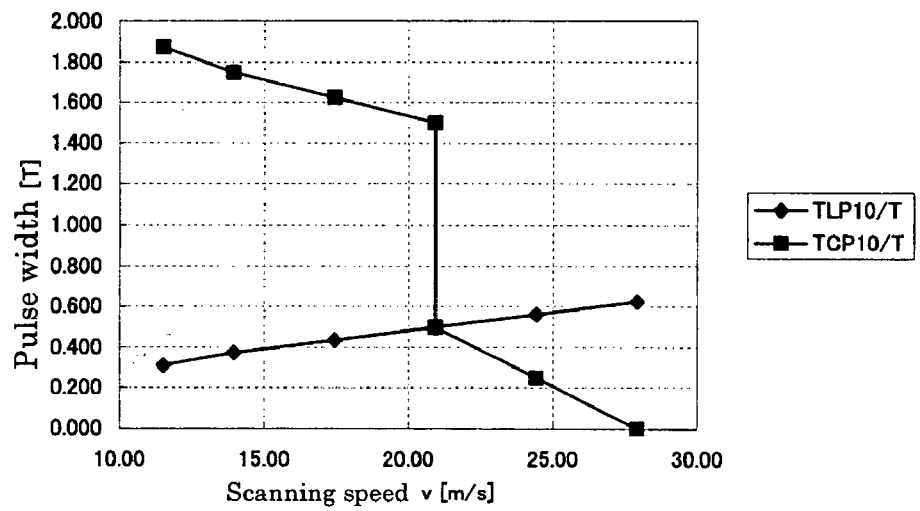
FIG. 14 is a graph showing the dependence of pulse length on scanning speed in Example 3.

The dependence of the parameters $T_{LP10}$ and $T_{CP10}$ on scanning speed is shown in FIG. 14. Namely, $T_{CP10}/T$ can be described by the following functions in case of $v_0$=20.94 m/s, $$v<v_0,\ T_{CP10}/T=f_{1,10}(v)=-0.0391\ v+2.312$$

$$v \geq v_0,\ T_{CP10}/T=f_{2,10}(v)=-0.072\ v+2.00$$

where the relation of $f_{1,10}(v_0)<f_{2,10}(v_0)$ was satisfied.

Figure 15:
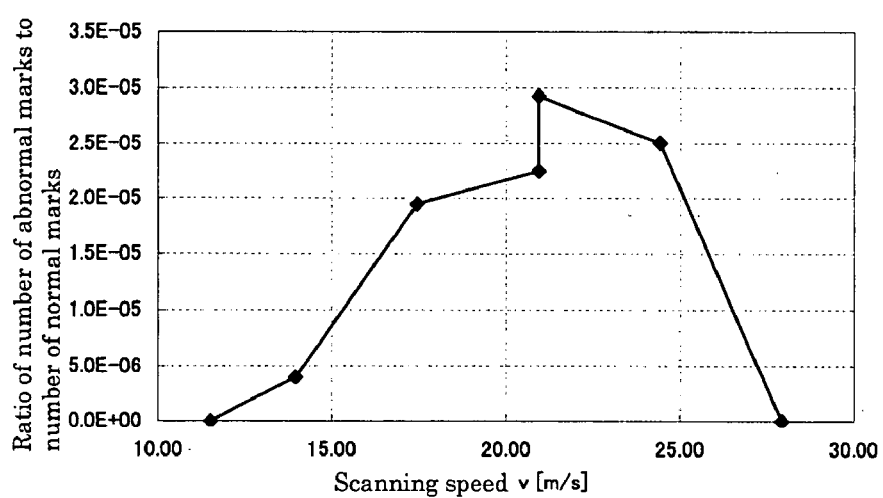
FIG. 15 is a graph showing the dependence of the ratio of the number of abnormal marks to the number of normal marks on scanning speed in Example 3.

Similarly, the results of measuring the ratio of the number of abnormal marks to number of normal marks are shown in FIG. 15. It has been confirmed that the number of abnormal marks is small and the reproduction reliability of recording signal is high in all measured regions. Further, it has been confirmed that it is effective for the recording of longer marks (large n) as well as the marks in case of n=3 and m=1.

EXAMPLE 4

For a sample disk same as Example 1, the recording was carried out using the same manner as Example 1, except for using the parameters of Table 5.

TABLE 5

| Speed | Scanning speed v (m/s) | Clock cycle T (ns) | TLP3/T | TCP3/T |
|---|---|---|---|---|
| 3.3X | 11.52 | 11.6 | 0.313 | 2.125 |
| 6.0X | 20.94 | 6.4 | 0.500 | 2.125 |
| 6.0X | 20.94 | 6.4 | 0.613 | 0.432 |
| 8.0X | 27.92 | 4.8 | 0.688 | 0.750 |

Figure 16:
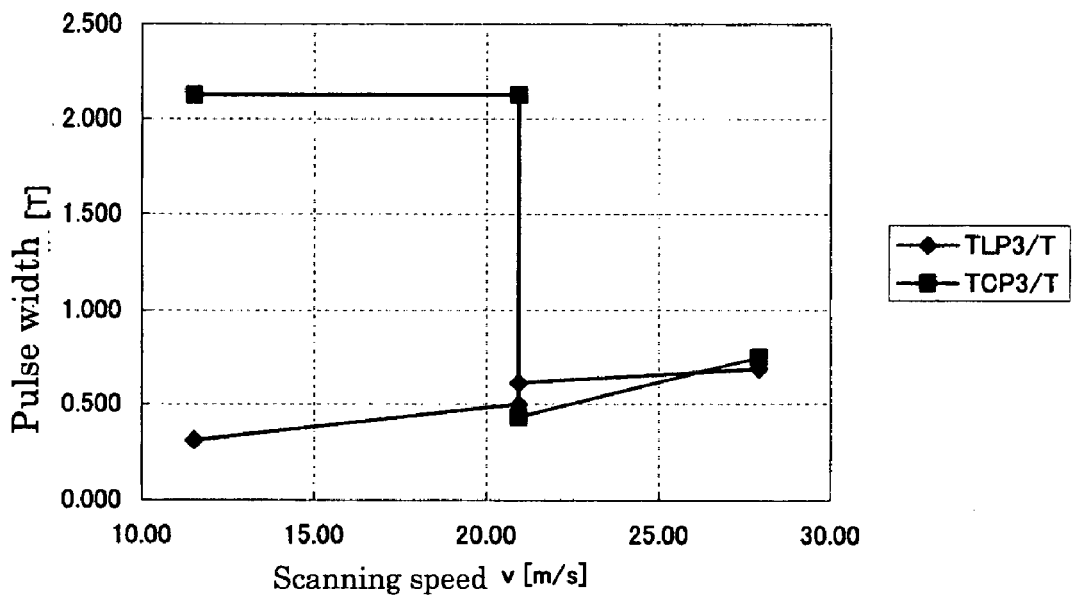
FIG. 16 is a graph showing the dependence of pulse length on scanning speed in Example 4.

The dependence of the parameters $T_{CP3}$ and $T_{LP3}$ on scanning speed is shown in FIG. 16. Both $T_{CP3}$ and $T_{LP3}$ were determined using two functions. When the same evaluation was carried out as Example 1, the existence ratio of abnormal marks was $1.0 \times 10^{-4}$ or less at each scanning speed.

EXAMPLE 5

Two kinds of sample disks were newly prepared similar to the sample disk of Example 1 (disk 1) except for changing the recording layer thickness and the upper protective layer thickness. Namely, one sample disk, which is referred to as a disk 2, was prepared having a 19 nm-thick recording layer and a 12 nm-thick upper protective layer, and the other, which is referred to as a disk 3, was prepared having a 12 nm-thick recording layer and a 6 nm-thick upper protective layer.

A pattern having alternate 3T marks and 3T spaces was recorded on the prepared disks 1 to 3, and the ratio of the number of abnormal marks to the number of normal marks was similarly measured as Example 1. At this time, the scanning speed was taken as 20.9 m/s equivalent to 6× speed of DVD, and the recordings were carried out by variously changing $T_{CP3}$ in a range of 0.75T to 2.25T.

Figure 18:
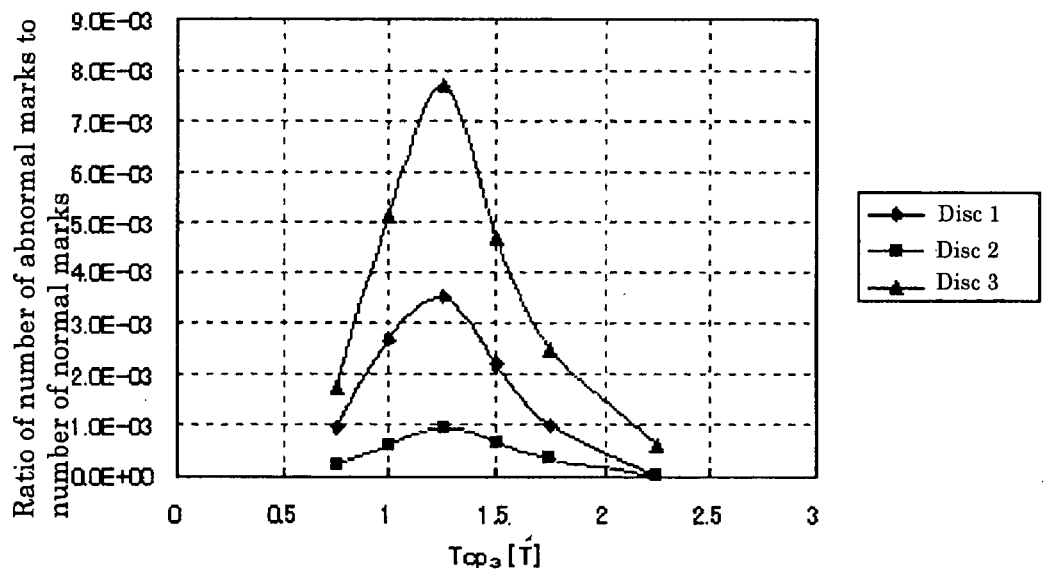
FIG. 18 is a graph showing the dependence of the ratio of the number of abnormal marks to the number of normal marks on $T_{CP3}$ in Example 5.

The $T_{CP3}$ dependence of the ratio of the number of abnormal marks to the number of normal marks is shown in FIG. 18. It has been found that the ratio of the number of abnormal marks to the number of normal marks greatly varies in disks of different constitutions.

Accordingly, it is possible to inspect the fluctuation of the constitution of optical recording medium by the above method.

EXAMPLE 6

The recording and evaluation of disks 1 to 3 same as Example 5 were similarly carried out as Example 1, except that the scanning speed was taken as 20.9 m/s equivalent to 6× speed of DVD, and $T_{CP3}$ was fixed at 0.75T.

Figure 19:
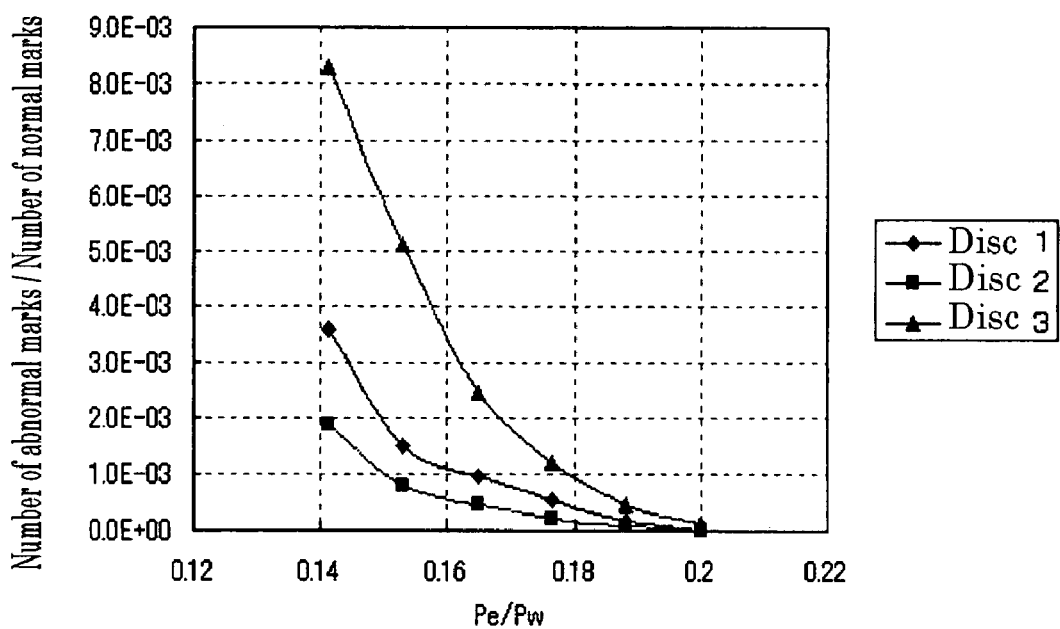
FIG. 19 is a graph showing a result from obtaining the dependence of the ratio of the number of abnormal marks to the number of normal marks on Pe in Example 6.

A pattern having alternate 3T marks and 3T spaces was recorded and the ratio of the number of abnormal marks to the number of normal marks was measured in a manner similar to that of Example 5. At this time, the recordings were carried out by variously changing the erasure power Pe of recording condition. The dependence of the ratio of the number of abnormal marks to the number of normal marks on Pe is shown in FIG. 19. In FIG. 19, the horizontal axis is a value specified by Pw in the case where Pw was fixed at 34 mW.

From FIG. 19, it has been found that the number of abnormal marks changes with changing the erasure power Pe. Particularly, in a range of low Pe/Pw, the number of abnormal marks greatly varied in the disks 1 to 3.

Accordingly, it is possible to inspect the fluctuation of the constitution of the disk by changing the erasure power Pe when the constitution of the disk fluctuates as with disks 1 to 3.

The invention claimed is:

1. A recording method of an optical recording medium corresponding to different recording speeds, comprising:
    irradiating the medium with a laser having m pulse sets each comprising a heating pulse of a power Pw and a cooling pulse of a power Pc, in which m is a natural number; and
    scanning the medium with the laser at a scanning speed v to record marks each of a length nT on the medium, in which n is a natural number of 3 or more, T is a clock cycle, and the relation of m<n is satisfied,
    wherein:
    a length $T_{CPn}$ of a final cooling pulse, which is the m-th cooling pulse, is determined in accordance with the scanning speed v using the following functions (1) and (2), in a range of $v < v_0$, $T_{CPn}/T = f_{1,n}(v)$     Function (1)

in a range of $v \geq v_0$, $T_{CPn}/T = f_{2,n}(v)$     Function (2), where the $f_{1,n}(v)$ and $f_{2,n}(v)$ each represents a continuous function of the scanning speed v to satisfy the relation of $f_{1,n}(v_0) > f_{2,n}(v_0)$;
    the $f_{1,n}(v)$ and $f_{2,n}(v)$ each satisfies the condition where an existence ratio of abnormal marks, which is a ratio of the number of abnormal marks to the number of normal marks, is $1.0 \times 10^{-4}$ or less, the normal mark satisfying the requirement of $L/nT \geq n-0.5$ and the abnormal mark satisfying the requirement of $L/nT < n-0.5$ where L is a length of each reproduced mark obtained by reproducing the recorded marks; and
    $v_0$ is any scanning speed selected to satisfy the existence ratio of the abnormal marks of $1.0 \times 10^{-4}$ or less.

2. The recording method of an optical recording medium according to claim 1, further comprising properly controlling a length $T_{LPn}$ of the final heating pulse, which is m-th heating pulse, in accordance with the scanning speed v.

3. The recording method according to claim 1, wherein at least one of the $f_{1,n}(v)$ and $f_{2,n}(v)$ is a linear function of the scanning speed v.

4. The recording method according to claim 1, wherein if n is an even number, the function of m=n/2 holds, and if n is an odd number, the function of m=(n−1)/2 holds.

5. The recording method according to claim 1, wherein the functions of $v_H/v_L \geq 2.4$ and $0.4\, v_H/v_L \leq v_0 \leq 0.8\, v_H$ are satisfied where a highest recording speed of the medium is represented by $v_H$ and a lowest recording speed of the medium is represented by $v_L$.

6. The optical recording medium, which is capable of being recorded using the recording method according to claim 1,
    wherein information able to univocally decide the $v_0$, $f_{1,n}(v)$ and $f_{2,n}(v)$ is pre-formatted.

7. A recording method of an optical recording medium corresponding to different recording speeds, comprising:
    irradiating the medium with a laser having m pulse sets each comprising a heating pulse of a power Pw and a cooling pulse of a power Pc, in which m is a natural number; and
    scanning the medium with the laser at a scanning speed v to record marks each of a length nT on the medium, in which n is a natural number of 3 or more, T is a clock cycle, and the relation of m<n is satisfied, wherein:

a length $T_{LPn}$ of a final heating pulse, which is the m-th heating pulse, is determined in accordance with the scanning speed v using the following functions (3) and (4), in a range of $v<v_0$, $T_{LPn}/T=g_{1,n}(v)$   Function (3)

in a range of $v \geq v_0$, $T_{LPn}/T=g_{2,n}(v)$   Function (4)

where the $g_{1,n}(v)$ and $g_{2,n}(v)$ each represents a continuous function of the scanning speed v to satisfy the relation of $g_{1,n}(v_0) > g_{2,n}(v_0)$;

the $g_{1,n}(v)$ and $g_{2,n}(v)$ each satisfies the condition where an existence ratio of abnormal marks, which is a ratio of the number of abnormal marks to the number of normal marks, is $1.0 \times 10^{-4}$ or less, the normal mark satisfying the requirement of $L/nT \geq n-0.5$ and the abnormal mark satisfying the requirement of $L/nT < n-0.5$ where L is a length of each reproduced mark obtained by reproducing the recorded marks; and $v_0$ is any scanning speed selected to satisfy the existence ratio of the abnormal marks of $1.0 \times 10^{-4}$ or less.

8. The recording method of optical recording medium according to claim 7, further comprising properly controlling a length $T_{CPn}$ of the final cooling pulse, which is the m-th cooling pulse, in accordance with the scanning speed v.

9. The recording method according to claim 7, wherein at least one of the $g_{1,n}(v)$ and $g_{2,n}(v)$ is a linear function of the scanning speed v.

10. The recording method according to claim 7, wherein the functions of $v_H/v_L \geq 2.4$ and $0.4\ v_H/v_L \leq v_0 \leq 0.8\ v_H$ are satisfied where a highest recording speed of the medium is represented by $v_H$ and a lowest recording speed of the medium is represented by $v_L$.

11. The recording method according to claim 7, wherein if n is an even number, the function of m=n/2 holds, and if n is an odd number, the function of m=(n−1)/2 holds.

12. The optical recording medium, which is capable of being recorded using the recording method according to claims 7, wherein information able to univocally decide the $v_0$, $g_{1,n}(v)$ and $g_{2,n}(v)$ is pre-formatted.

13. A recording method of an optical recording medium corresponding to different recording speeds, comprising:

irradiating the medium with a laser having m pulse sets each comprising a heating pulse of a power Pw and a cooling pulse of a power Pc, in which m is a natural number; and scanning the medium with the laser at a scanning speed v to record marks each of a length nT on the medium, in which n is a natural number of 3 or more, T is a clock cycle, and the relation of m<n is satisfied, wherein:

both of a length $T_{CPn}$ of a final cooling pulse and a length $T_{LPn}$ of a final heating pulse, which are the m-th cooling pulse and the m-th heating pulse, respectively, are determined in accordance with the scanning speed v using the following functions (1) and (4), in a range of $v<v_0$, $T_{CPn}/T=f_{1,n}(v)$   Function (1)

in a range of $v \geq v_0$, $T_{CPn}/T=f_{2,n}(v)$   Function (2)

in a range of $v<v_0$, $T_{LPn}/T=g_{1,n}(v)$   Function (3)

in a range of $v \geq v_0$, $T_{LPn}/T=g_{2,n}(v)$   Function (4)

where the $f_{1,n}(v)$, $f_{2,n}(v)$, $g_{1,n}(v)$ and $g_{2,n}(v)$ each represents a continuous function of the scanning speed v to satisfy the relations of $f_{1,n}(v_0) > f_{2,n}(v_0)$ and $g_{1,n}(v_0) > g_{2,n}(v_0)$;

the $f_{1,n}(v)$, $f_{2,n}(v)$, $g_{1,n}(v)$ and $g_{2,n}(v)$ each satisfies the condition where an existence ratio of abnormal marks, which is a ratio of the number of abnormal marks to the number of normal marks, is $1.0 \times 10^{-4}$ or less, the normal mark satisfying the requirement of $L/nT \geq n-0.5$ and the abnormal mark satisfying the requirement of $L/nT < n-0.5$ where L is a length of each reproduced mark obtained by reproducing the recorded marks; and $v_0$ is any scanning speed selected to satisfy the existence ratio of the abnormal marks of $1.0 \times 10^{-4}$ or less.

14. The recording method according to claim 13, wherein at least one of the $f_{1,n}(v)$ and $f_{2,n}(v)$ and at least one of the $g_{1,n}(v)$ and $g_{2,n}(v)$ are linear functions of the scanning speed v.

15. The recording method according to claim 13, wherein if n is an even number, the function of m=n/2 holds, and if n is an odd number, the function of m=(n−1)/2 holds.

16. The recording method according to claim 13, wherein the functions of $v_H/v_L \geq 2.4$ and $0.4\ v_H/v_L \leq v_0 \leq 0.8\ v_H$ are satisfied where a highest recording speed of the medium is represented by $v_H$ and a lowest recording speed of the medium is represented by $v_L$.

17. The optical recording medium, which is capable of being recorded using the recording method according to claim 13, wherein information able to univocally decide the $v_0$, $f_{1,n}(v)$, $f_{2,n}(v)$, $g_{1,n}(v)$ and $g_{2,n}(v)$ is pre-formatted.

18. An evaluation method of an optical recording medium corresponding to different recording speeds, where marks are recorded on the optical recording medium by:

irradiating the medium with a laser having m pulse sets each comprising a heating pulse of a power Pw and a cooling pulse of a power Pc, in which m is a natural number; and scanning the medium with the laser at a scanning speed v to record the marks each of a length nT on the medium, in which n is a natural number of 3 or more, T is a clock cycle, and the relation of m<n is satisfied, the evaluation method comprising:

performing test recordings by variously changing a length $T_{CPn}$ of a final cooling pulse, which is the m-th cooling pulse;

reproducing the test recorded marks;

measuring respective lengths L of the reproduced marks;

counting normal marks satisfying the requirement of $L/nT \geq n-0.5$ and abnormal marks satisfying the requirement of $L/nT < n-0.5$; and obtaining an existence ratio of the abnormal marks, which is a ratio of the number of the abnormal marks to the number of the normal marks, to evaluate the quality of the optical recording medium.

19. The evaluation method according to claim 18, wherein the test recordings are carried out using a pattern having alternate 3T marks and 3T spaces between the marks in case of n=3.

20. The evaluation method according to claim 18, wherein the scanning speed is made to be an average value of the highest recording speed and the lowest recording speed of the medium.

21. The evaluation method according to claim 18, wherein the test recordings are carried out at the lowest recording speed of the medium using a pattern having alternate 4T marks and 4T spaces in case of n=4.

22. An evaluation method of an optical recording medium corresponding to different recording speeds,
where the optical recording medium is a direct overwrite medium on which marks are recorded by:
irradiating the medium the medium with a laser having m pulse sets each comprising a heating pulse of a power Pw and a cooling pulse of a power Pc, in which m is a natural number; and
scanning the medium with the laser at a scanning speed v to record the marks each of a length nT on the medium, in which n is a natural number of 3 or more, T is a clock cycle, and the relation of m<n is satisfied,
and the recorded marks are erased by:
irradiating non-recorded regions of the medium, which are spaces between the marks, with the laser having an erasing pulse of a power Pe, in which the relation of Pw>Pe>Pc is satisfied,
the evaluation method comprising:
performing test recordings by variously changing the power Pe;
reproducing the test recorded marks;
measuring respective lengths L of the reproduced marks;
counting normal marks satisfying the requirement of $L/nT \geq n-0.5$ and abnormal marks satisfying the requirement of $L/nT < n-0.5$; and; obtaining an existence ratio of the abnormal marks, which is a ratio of the number of the abnormal marks to the number of the normal marks, to evaluate the quality of the optical recording medium.

23. The evaluation method according to claim 22, wherein the test recordings are carried out using a pattern having alternate 3T marks and 3T spaces between the marks in case of n=3.

24. The evaluation method according to claim 22, wherein the scanning speed is made to be an average value of the highest recording speed and the lowest recording speed of the medium.

25. The evaluation method according to claim 22, wherein the test recordings are carried out at the lowest recording speed of the medium using a pattern having alternate 4T marks and 4T spaces in case of n=4.

* * * * *